United States Patent
Hasegawa

(10) Patent No.: US 9,525,456 B2
(45) Date of Patent: Dec. 20, 2016

(54) RECEIVING DEVICE AND RECEIVING PROCESS METHOD

(71) Applicant: FUJITSU LIMITED, Kawasaki-shi, Kanagawa (JP)

(72) Inventor: Tsuyoshi Hasegawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/794,200

(22) Filed: Jul. 8, 2015

(65) Prior Publication Data
US 2016/0065266 A1 Mar. 3, 2016

(30) Foreign Application Priority Data
Aug. 29, 2014 (JP) ................................. 2014-175458

(51) Int. Cl.
| | | |
|---|---|---|
| H04B 1/00 | (2006.01) | |
| H04B 1/7103 | (2011.01) | |
| H04B 1/709 | (2011.01) | |
| H04L 1/06 | (2006.01) | |
| H04L 25/03 | (2006.01) | |

(52) U.S. Cl.
CPC ............ *H04B 1/7103* (2013.01); *H04B 1/709* (2013.01); *H04L 1/0631* (2013.01); *H04B 2201/709736* (2013.01); *H04L 1/0643* (2013.01); *H04L 2025/03426* (2013.01)

(58) Field of Classification Search
CPC .................................................. H04B 1/7097
USPC ......................................................... 375/148
See application file for complete search history.

(56) References Cited

U.S. PATENT DOCUMENTS

| | | | | |
|---|---|---|---|---|
| 8,897,392 B2* | 11/2014 | Lin | ...................... | H04B 7/0608 |
| | | | | 375/299 |
| 2002/0126741 A1* | 9/2002 | Baum | .................. | H04B 1/7097 |
| | | | | 375/144 |
| 2006/0285580 A1* | 12/2006 | Kinnunen | .......... | H04B 1/70751 |
| | | | | 375/147 |
| 2009/0052566 A1* | 2/2009 | Maltsev | .............. | H04L 27/2647 |
| | | | | 375/260 |
| 2011/0305262 A1* | 12/2011 | Medles | ................ | H04B 7/0417 |
| | | | | 375/147 |
| 2012/0275491 A1 | 11/2012 | Ancora et al. | | |

FOREIGN PATENT DOCUMENTS

| | | |
|---|---|---|
| JP | 2013-505610 | 2/2013 |
| WO | 2011032699 | 3/2011 |

OTHER PUBLICATIONS

Byoung-Hoon Kim, et al., "Linear MMSE Space-Time Equalizer for MIMO Multicode CDMA Systems", IEEE Transactions on Communications, vol. 54, No. 10, Oct. 2006, pp. 1710-1714 (5 pages).

* cited by examiner

*Primary Examiner* — Lihong Yu
(74) *Attorney, Agent, or Firm* — Fujitsu Patent Center

(57) ABSTRACT

A communication processor in a receiving device includes a chip equalizer, a correction matrix calculating unit, and a correction unit. The chip equalizer equalizes a plurality of reception signal sequences received via an antenna. The correction matrix calculating unit calculates a correction matrix by using a channel matrix, a weight of an equalizer, a power ratio of a pilot signal to a reception signal, a number of multi codes, and a spreading factor of the reception signal sequences. The correction unit corrects, by using the correction matrix, the reception signal sequences equalized by the chip equalizer.

10 Claims, 17 Drawing Sheets

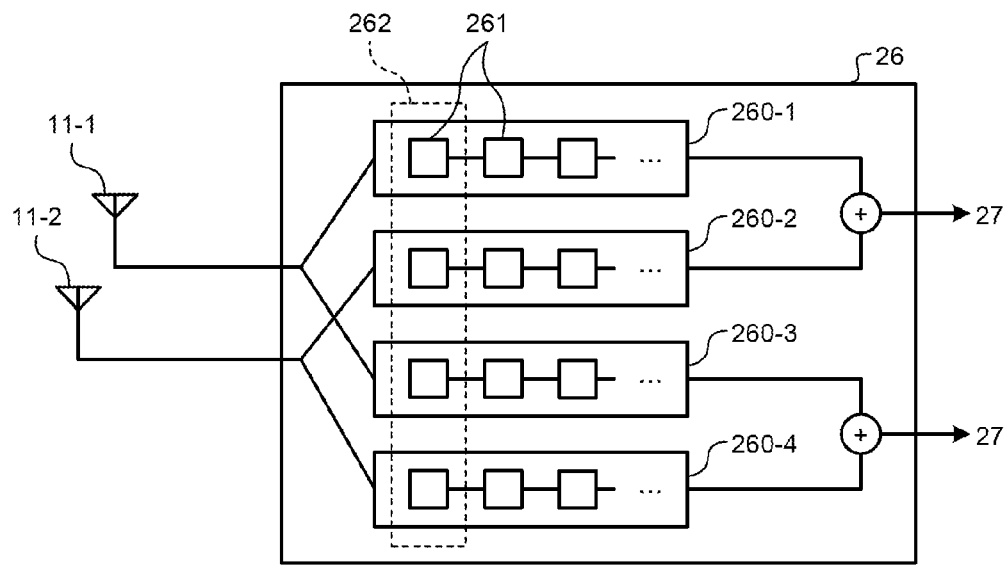

RECEIVING DEVICE AND RECEIVING PROCESS METHOD

CROSS-REFERENCE TO RELATED APPLICATION

This application is based upon and claims the benefit of priority of the prior Japanese Patent Application No. 2014-175458, filed on Aug. 29, 2014, the entire contents of which are incorporated herein by reference.

FIELD

The embodiments discussed herein are directed to a receiving device and a receiving process method.

BACKGROUND

When signals based on a code division multiple access (CDMA) method are demodulated, chip equalizers may sometimes be used. In a chip equalizer, the weight of the equalizer is determined such that the average error power becomes the minimum with respect to multiplexed reception signals that have not been subjected to de-spreading. However, in a reception method, such as High-Speed Downlink Packet Access (HSDPA) or the like, that uses CDMA and Multiple-Input and Multiple-Output (MIMO) in combination, it is known that the receiving performance of BER or the like is further improved if the weight of the equalizer is determined such that the average error power becomes the minimum with respect to the reception signals that have been subjected to de-spreading, rather than with respect to reception signals that have not been subjected to de-spreading.

Patent Document 1: Japanese National Publication of International Patent Application No. 2013-505610

Non-Patent Document 1: Byoung-Hoon Kim, Xiaoxia Zhang, Flury, M., "Linear MMSE space-time equalizer for MIMO multicode CDMA systems", IEEE Trans. Communications, Vol. 54, No. 10, pp. 1710-1714, Oct. 2006.

When calculating the weight of an equalizer in which the average error power is the minimum with respect to the reception signals that have been subjected to de-spreading, for example, the spreading factor is used as one of the parameters. Accordingly, if the spreading factor differs, the weight of the equalizer also differs. Consequently, as in the HSDPA method, in the reception method that uses CDMA and MIMO in combination, instead of equalizers that are conventionally used, equalizers in which the weight of the equalizers can be changed in accordance with the spreading factor are provided. This increases the cost of the receiving devices.

SUMMARY

According to an aspect of an embodiment, a receiving device includes a chip equalizer, a calculating unit, and a correction unit. The chip equalizer equalizes a plurality of reception signal sequences received via an antenna. The calculating unit calculates a correction matrix by using a channel matrix, a weight of the equalizer, a power ratio of a pilot signal to a reception signal, a number of multi codes, and a spreading factor of the reception signal sequences. The correction unit corrects, by using the correction matrix, the reception signal sequences equalized by the chip equalizer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a schematic diagram illustrating an example of a chip equalizer;

FIG. 6 is a schematic diagram illustrating a difference between the amounts of processes;

DESCRIPTION OF EMBODIMENTS

Preferred Embodiments of the Present Invention will be explained with reference to accompanying drawings. The disclosed technology is not limited to the embodiments described below. The embodiments can be appropriately used in combination as long as the processes do not conflict with each other.

[a] First Embodiment

Receiving Device 10

Figure 1:
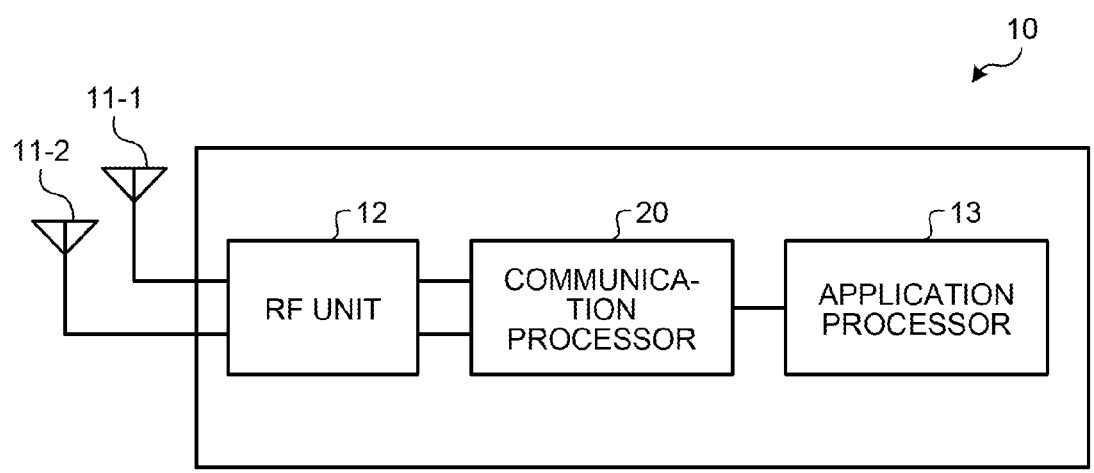
FIG. 1 is a block diagram illustrating a receiving device according to a first embodiment.

FIG. 1 is a block diagram illustrating a receiving device 10 according to a first embodiment. A receiving device 10 according to the first embodiment includes a plurality of antennas 11-1 and 11-2, a radio frequency (RF) unit 12, a communication processor 20, and an application processor 13.

The RF unit 12 down converts radio signals of a carrier frequency, which are received from devices (for example, base stations) on the transmission side via the antennas 11-1 and 11-2, to baseband signals of a baseband frequency. Then, the RF unit 12 sends, to the communication processor 20, digital signals that are obtained by performing quadrature demodulation and analog to digital (A/D) conversion on the baseband signals.

Furthermore, after performing digital to analog (D/A) conversion on the digital signals received from the communication processor 20, the RF unit 12 performs quadrature modulation. Then, the RF unit 12 up converts the signals of the baseband frequency, which have been subjected to the quadrature modulation, to the radio signals of the carrier frequency and sends the radio signals from each of the antennas 11-1 and 11-2 at predetermined power.

The communication processor 20 performs a process of demodulation, decoding, error correction, or the like on the baseband signals received from the RF unit 12 and then outputs the processed signals to the application processor 13. Furthermore, the communication processor 20 encodes a data received from the application processor 13, performs digital modulation on the encoded data, and outputs the modulated digital signals to the RF unit 12.

In the first embodiment, the communication processor 20 is implemented by, for example, a single central processing unit (CPU); however, as another embodiment, the communication processor 20 may also be implemented by two or more CPUs, digital signal processors (DSPs), or the like in combination. Furthermore, in the first embodiment, the RF unit 12, the communication processor 20, and the application processor 13 are described as separate processors; however, for example, these processors may also be implemented by a single chip by using a System-on-a-Chip (SoC) technology or the like. Furthermore, in the first embodiment, a description will be given, as an example, of the MIMO system in which two antennas are used on each of the transmission side and the reception side. However, two or more antennas may also be used on each of the transmission side and the reception side.

Communication Processor 20

Figure 2:
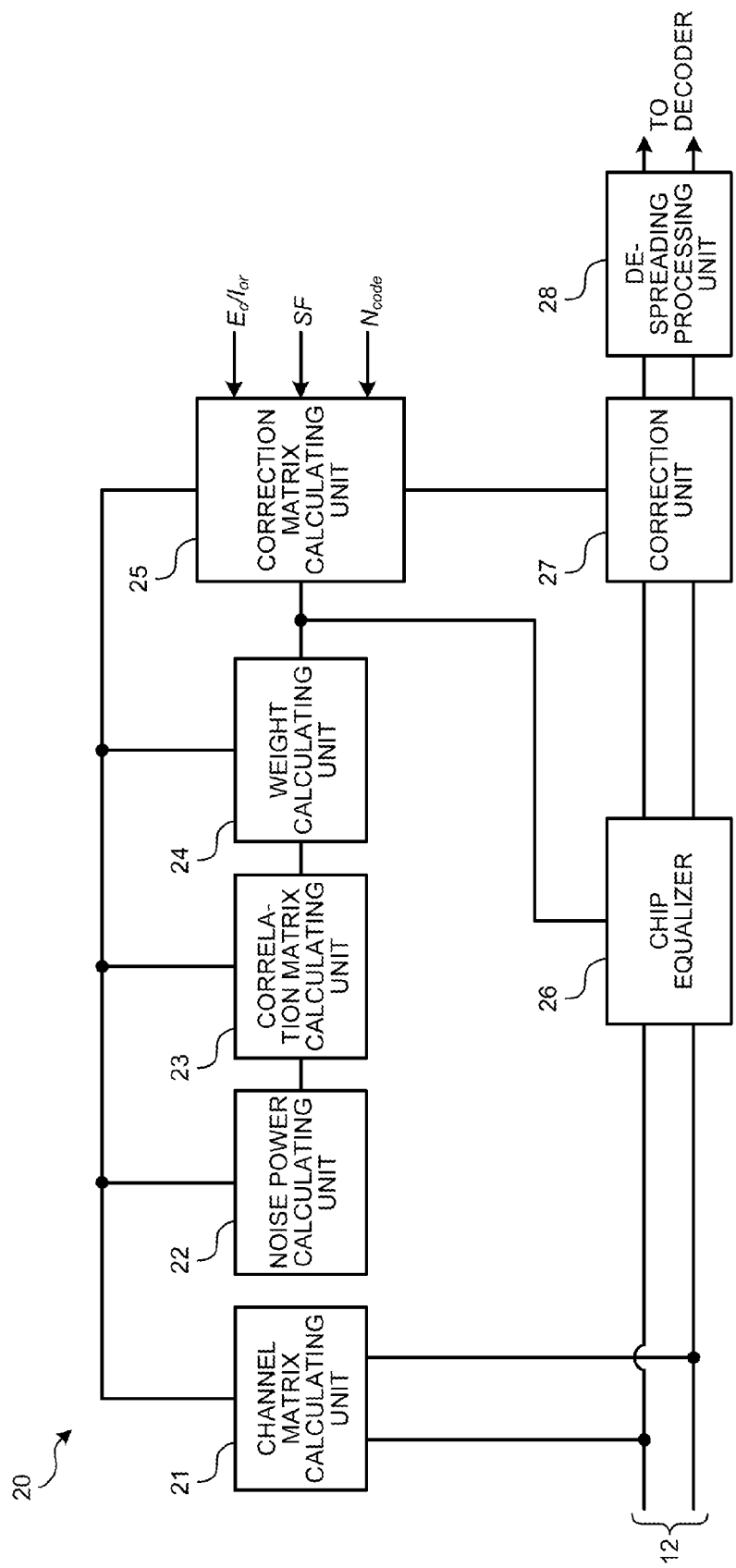
FIG. 2 is a block diagram illustrating an example of a communication processor according to the first embodiment.

FIG. 2 is a block diagram illustrating an example of a communication processor 20 according to the first embodiment. A communication processor 20 according to the first embodiment includes a channel matrix calculating unit 21, a noise power calculating unit 22, a correlation matrix calculating unit 23, a weight calculating unit 24, a correction matrix calculating unit 25, a chip equalizer 26, a correction unit 27, and a de-spreading processing unit 28.

The channel matrix calculating unit 21 calculates a channel estimated value of a wireless transmission path on the basis of a plurality of reception signal sequences received via each of the antennas 11-1 and 11-2. Then, the channel matrix calculating unit 21 calculates a channel matrix H on the basis of the calculated channel estimated value. The noise power calculating unit 22 calculates noise power $\sigma^2$ by using the channel matrix H calculated by the channel matrix calculating unit 21. The correlation matrix calculating unit 23 calculates a correlation matrix R by using both the channel matrix H calculated by the channel matrix calculating unit 21 and the noise power $\sigma^2$ calculated by the noise power calculating unit 22.

The weight calculating unit 24 calculates a weight w of a chip equalizer by using both the channel matrix H calculated by the channel matrix calculating unit 21 and the correlation matrix R calculated by the correlation matrix calculating unit 23. The chip equalizer 26 equalizes, on the basis of the weight w of the chip equalizer calculated by the weight calculating unit 24, the reception signal sequences that are output from the RF unit 12. For example, a known minimum mean square error (MMSE) equalizer may be used for the chip equalizer 26.

The correction matrix calculating unit 25 calculates a correction matrix M by using the channel matrix H calculated by the channel matrix calculating unit 21, the weight w of the chip equalizer calculated by the weight calculating unit 24, the power ratio $E_c/I_{or}$ of a pilot signal to a reception signal, the spreading factor SF, and the number of multi codes $N_{code}$. By multiplying the inverse matrix of the correction matrix M calculated by the correction matrix calculating unit 25 by the reception signal sequences equalized by the chip equalizer 26, the correction unit 27 corrects the reception signal sequences equalized by the chip equalizer 26. The de-spreading processing unit 28 performs de-spreading, on the basis of the spreading factor SF, the reception signal sequences that have been corrected by the correction unit 27 and then outputs the reception signal sequences that have been subjected to the de-spreading to a decoder.

Here, the transmission signal vectors obtained by sequentially arranging the transmission signals $x_i$ in time series are defined to be $x=(x_1, x_2, \ldots, x_n)^T$ (T indicates a transposition symbol). Furthermore, the reception signal vectors obtained by sequentially arranging, in time series, the reception signals, which have not been subjected to de-spreading, corresponding to the reception window width are defined to be $y=(y_1, y_2, \ldots, y_m)^T$. Consequently, the reception signal vectors y can be represented by an expression (1) below by using the channel matrix H and a reception noise vector z:

$$y = Hx + z \quad (1)$$

Here, consider the case in which transmission signals $x_1$ are restored by using the signal $w^H y$ that is obtained by multiplying an appropriate weight vector w by the reception signal vectors y and combined ($w^H$ means the Hermitian transposition of w). The weight in which a mean square error of the transmission signal $x_i$ becomes the minimum is known as the MMSE weight and is obtained by using the expressions below:

$$Rw = h_{a_1} \quad (2)$$

$$R = HH^H + \sigma^2 I \quad (3)$$

$$w = R^{-1} h_{a_1} \quad (4)$$

where, R represents a correlation matrix and I represents a unit matrix. The symbol $h_{a1}$ represents, when the channel matrix H is represented by $H=(h_1, h_2, \ldots, h_n)$ by using the column vector $h_i$, the column vector that is associated with the timing $a_1$ that is desired to be demodulated. Furthermore, when the notation of the channel matrix H is used, the correlation matrix R may also be represented as below:

$$R = \sum_i h_i h_i^H + \sigma^2 I \quad (5)$$

Here, consider the case of the weight obtained when a single transmission antenna and a single reception antenna are used (i.e., the MIMO system is not used in this case). In a case of CDMA in which the number of multi codes is one, because only the term related to the correct timing $i=a_i$ is increased by a factor of the spreading factor (by a factor of $N_{SF}$) after the de-spreading is performed, the correlation matrix R is changed by that amount. The correlation matrix $R_D$ after the de-spreading is performed can be calculated by using, for example, the expressions below:

$$R_D = \sum_{i \neq a_1} h_i h_i^H + N_{SF} h_{a_1} h_{a_1}^H + \sigma^2 I \quad (6)$$

$$R_D = R + (N_{SF} - 1) h_{a_1} h_{a_1}^H \quad (7)$$

$$w_D = R_D^{-1} h_{a_1} \quad (8)$$

Here, consider the relationship between the weight w of the chip equalizer before the de-spreading is performed and the weight $w_D$ of the chip equalizer after the de-spreading is performed. If the correlation matrix R in an expression (7) is substituted in the correlation matrix R in an expression (2) and an expression (8) is applied to the expression (2), Equation below is obtained representing the relationship between the weight w of the chip equalizer obtained before the de-spreading is performed and the weight $w_D$ of the chip equalizer obtained after the de-spreading is performed.

$$(R_D - (N_{SF}-1) h_{a_1} h_{a_1}^H) w = h_{a_1} \quad (9)$$

$$R_D w = h_{a_1} + (N_{SF}-1) h_{a_1} h_{a_1}^H w \quad (10)$$

$$w = w_D (1 + (N_{SF}-1) h_{a_1}^H w) \quad (11)$$

Here, the term on the right side of an expression (11) is a scalar value. Accordingly, the weight vector w of the chip equalizer before the de-spreading corresponds to a constant multiple of the entire weight vector $w_D$ of the chip equalizer after the de-spreading is performed and this indicates that there is no substantial difference between w and $w_D$.

In the following, consider the weight when two transmission antennas and two reception antennas are used (i.e., the MIMO system is used). In a 2×2 MIMO system, the transmission signal vectors are represented by $x=(x_{11}, x_{12}, \ldots x_{1n}, x_{21}, x_{22}, \ldots, x_{2n})^T$ obtained by collecting signals passing through two sets of antennas and thus the reception signal vectors y and the channel matrix H are increased accordingly. Furthermore, the weight of the chip equalizer for each of the two sets of antennas is represented by $w_1$ and $w_2$.

As for the 2×2 MIMO system, the same calculation can also be used for a case in which a single transmission antenna and a single reception antenna are used except for some case. The 2×2 MIMO system differs from a case in which each of a single transmission antenna and a reception antenna is used in that, when a correlation matrix $R_D$ after the de-spreading has been performed is calculated, at the same timing as that of $a_1$, for the transmission antenna, the other term (defined to be $a_2$) is also multiplied by $N_{SF}$.

$$R(w_1 w_2) = (h_{a_1} h_{a_2}) \quad (12)$$

$$R_D (w_{D1} w_{D2}) = (h_{a_1} h_{a_2}) \quad (13)$$

$$R_D = R + (N_{SF} - 1) h_{a_1} h_{a_1}^H + (N_{SF} - 1) h_{a_2} h_{a_2}^H \quad (14)$$
$$= R + (N_{SF} - 1)(h_{a_1} h_{a_2})(h_{a_1} h_{a_2})^H$$

By substituting an expression (14) above in an expression (12) and simplifying the expression, the following relational expression is obtained.

$$(w_1 w_2) = (w_{D1} w_{D2})(I + (N_{SF}-1)(h_{a_1} h_{a_2})^H (w_1 w_2)) \quad (15)$$

Because in parentheses of the right side on the right side of the term of an expression (15) above is a 2×2 matrix, this indicates that the weight vectors ($w_1$ and $w_2$) of the chip equalizers, which is obtained before de-spreading is performed, is not obtained by simply multiplying weight vectors ($w_{D1}$ and $w_{D2}$) of the chip equalizers, which are obtained after the de-spreading has been performed, by a scalar.

Up to this point, the calculation is performed in a case in which another user is not present and the number of multi codes is only one; however, if another user is present, $E_c/I_{or}$ that is the power ratio of the reception signal to the pilot signal and the number of multi codes $N_{code}$ are considered. If another user is present, the weight vectors ($w_1$ and $w_2$) of the chip equalizers before the de-spreading is performed and the weight vectors ($w_{D1}$ and $w_{D2}$) of the chip equalizers after the de-spreading is performed are as follows.

$$(w_1 w_2) = (w_{D1} w_{D2})\left(I + \left(\frac{N_{SF}(E_c/I_{or})}{N_{code}} - 1\right)(h_{a_1} h_{a_2})^H (w_1 w_2)\right) \quad (16)$$

$$(w_{D1} w_{D2}) = (w_1 w_2)\left(I + \left(\frac{N_{SF}(E_c/I_{or})}{N_{code}} - 1\right)(h_{a_1} h_{a_2})^H (w_1 w_2)\right)^{-1} \quad (17)$$

To further simplify the expressions, the following equation is obtained.

$$W_D = W M^{-1} \quad (18)$$

$$W = (w_1 w_2) = R^{-1}(h_{a_1} h_{a_2}) \quad (19)$$

$$W_D = (w_{D1} w_{D2}) \quad (20)$$

$$M = I + \left(\frac{N_{SF}(E_c/I_{or})}{N_{code}} - 1\right)(h_{a_1} h_{a_2})^H W \quad (21)$$

As is clear from an expression (18) above, instead of the weight vector $w_D$ of the chip equalizer obtained after the de-spreading is performed, even if correction is performed by using the inverse matrix of the correction matrix M after a process has been performed by a conventional chip equalizer, reception signals that have been subjected to the de-spreading can be optimized such that the average error power is the minimum. The correction matrix calculating unit 25 in the first embodiment, the correction matrix M is calculated on the basis of an expression (21) above. Then, the correction unit 27 multiplies the inverse matrix of the correction matrix M calculated by the correction matrix calculating unit 25 by the reception signal sequences equalized by the chip equalizer 26, thereby the correction unit 27 corrects the reception signal sequences that have been equalized by the chip equalizer 26.

Operation of the Communication Processor 20

Figure 3:
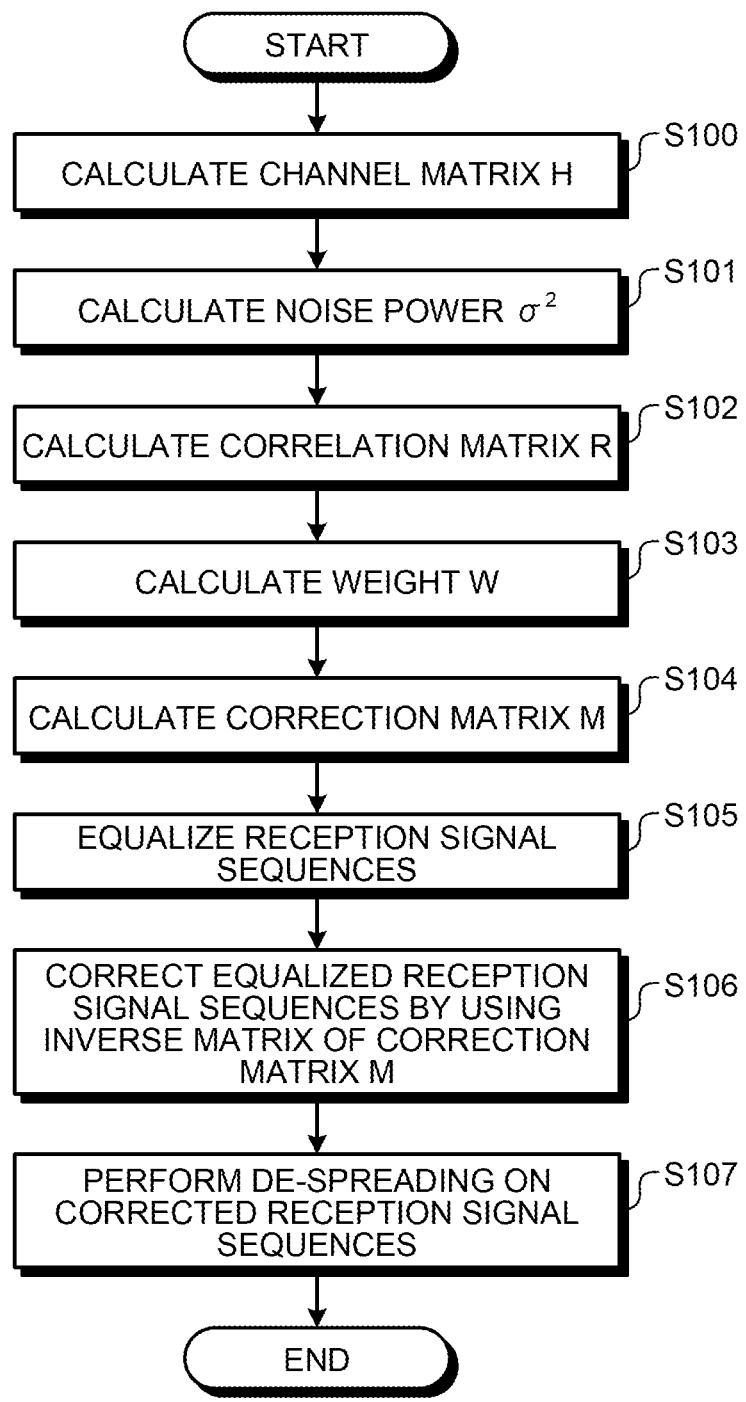
FIG. 3 is a flowchart illustrating an example of the receiving process.

FIG. 3 is a flowchart illustrating an example of the receiving process.

First, the channel matrix calculating unit 21 calculates a channel estimated value of a wireless transmission path on the basis of a plurality of reception signal sequences received via each of the antennas 11-1 and 11-2. Then, the channel matrix calculating unit 21 calculates a channel matrix H on the basis of the calculated channel estimated value (Step S100).

Then, the noise power calculating unit 22 calculates the noise power $\sigma^2$ by using the channel matrix H calculated by the channel matrix calculating unit 21 (Step S101). Then, the correlation matrix calculating unit 23 calculates a correlation matrix R by using the channel matrix H calculated by the channel matrix calculating unit 21 and by using the noise power $\sigma^2$ calculated by the noise power calculating unit 22 (Step S102).

Then, the weight calculating unit 24 calculates a weight w of a chip equalizer by using the channel matrix H calculated by the channel matrix calculating unit 21 and the correlation matrix R calculated by the correlation matrix calculating unit 23 (Step S103). Then, the correction matrix calculating unit 25 calculates a correction matrix M by using the channel matrix H calculated by the channel matrix calculating unit 21, the weight w of the chip equalizer calculated by the weight calculating unit 24, the power ratio $E_c/I_{or}$, the spreading factor SF, and the number of multi codes $N_{code}$ (Step S104).

Then, on the basis of the weight w of the chip equalizer calculated by the weight calculating unit 24, the chip equalizer 26 equalizes the reception signal sequences output from the RF unit 12 (Step S105). Then, by multiplying the inverse matrix of the correction matrix M calculated by the correction matrix calculating unit 25 by the reception signal sequences equalized by the chip equalizer 26, the correction unit 27 corrects the reception signal sequences equalized by the chip equalizer 26 (Step S106). Then, the de-spreading processing unit 28 performs, on the basis of the spreading factor SF, the de-spreading on the reception signal sequences corrected by the correction unit 27 and then outputs the reception signal sequences that have been subjected to the de-spreading to a decoder (Step S107).

Advantage of the First Embodiment

With the communication processor 20 according to the first embodiment, because the chip equalizer 26 that is the same as that used in the conventional technology, it is possible to suppress an increase in manufacturing cost for the communication processor 20 for improving the receiving performance in the MIMO system.

[b] Second Embodiment

The communication processor 20 according to a second embodiment differs from the communication processor 20 according to the first embodiment in that a plurality of reception signal sequences with different spreading factors $SF_1$ and $SF_2$ are demodulated in parallel. With HSDPA, even in the time period for which a data channel is being demodulated, a control channel is also being demodulated in parallel. Because the data channel and the control channel are spread by different spreading factors SFs, if the demodulation of the data channel and the demodulation of the control channel are performed in parallel, the reception signal sequences with different spreading factors are demodulated.

Communication Processor 20

Figure 4:
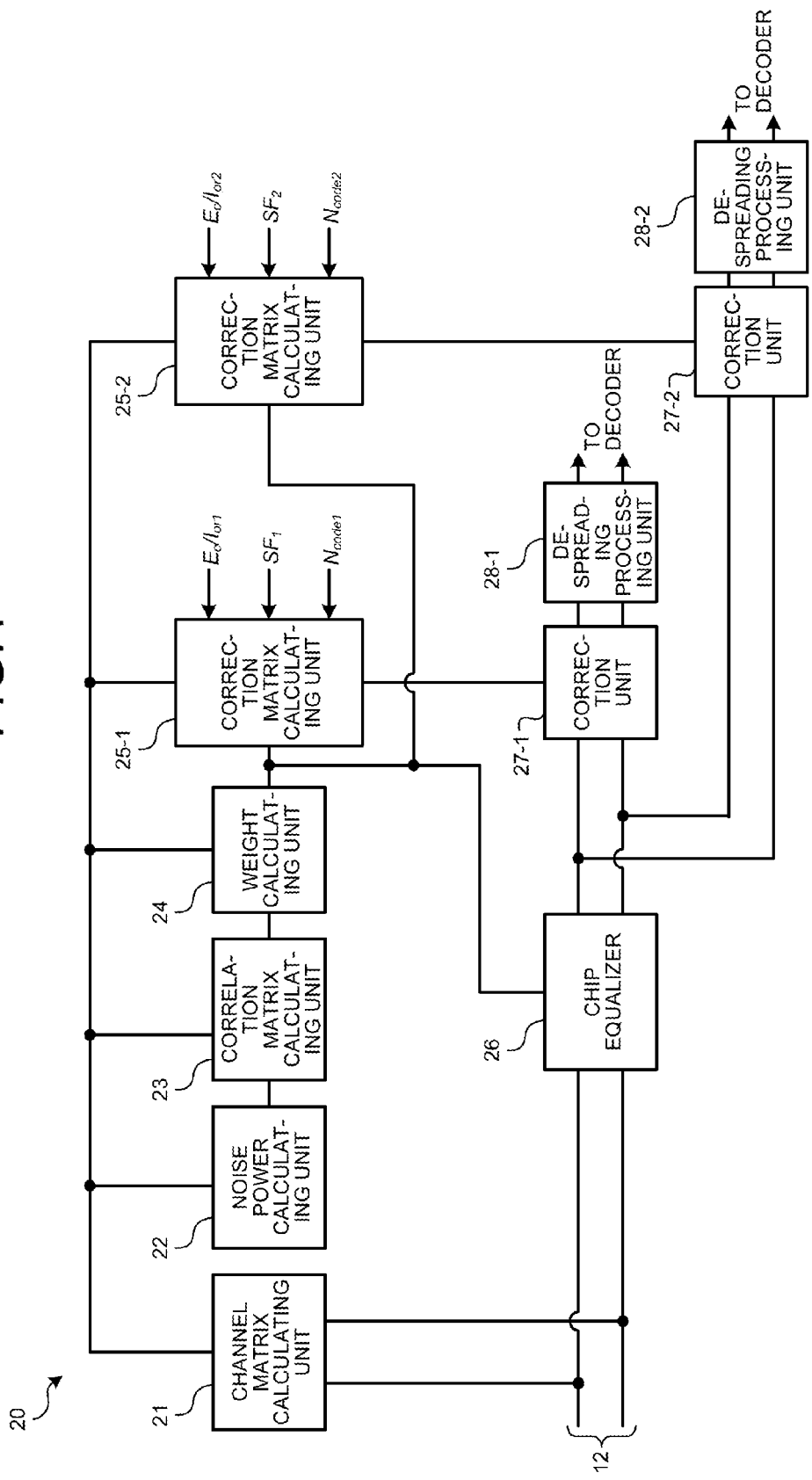
FIG. 4 is a block diagram illustrating an example of a communication processor according to a second embodiment.

FIG. 4 is a block diagram illustrating an example of the communication processor 20 according to the second embodiment. The communication processor 20 according to the second embodiment includes the channel matrix calculating unit 21, the noise power calculating unit 22, the correlation matrix calculating unit 23, the weight calculating unit 24, and a plurality of correction matrix calculating units 25-1 and 25-2. Furthermore, the communication processor 20 according to the second embodiment includes the chip equalizer 26, a plurality of correction units 27-1 and 27-2, and a plurality of de-spreading processing units 28-1 and 28-2. The components illustrated in FIG. 4 having the same reference numerals as those illustrated in FIG. 2 have the same or similar functions as those illustrated in FIG. 2 except for the following points described below; therefore, descriptions thereof will be omitted.

The correction matrix calculating unit 25-1 calculates a correction matrix $M_1$ by using the channel matrix H calculated by the channel matrix calculating unit 21, a weight w of the chip equalizer calculated by the weight calculating unit 24, the power ratio $E_c/I_{or1}$, the spreading factor $SF_1$, and the number of multi codes $N_{code1}$. By multiplying the inverse matrix of the correction matrix $M_1$ calculated by the correction matrix calculating unit 25-1 by the reception signal sequences equalized by the chip equalizer 26, the correction unit 27-1 corrects the reception signal sequences equalized by the chip equalizer 26. Then, the de-spreading processing unit 28-1 performs, on the basis of the spreading factor $SF_1$, the de-spreading on the reception signal sequences corrected by the correction unit 27-1 and then outputs the reception signal sequences that have been subjected to the de-spreading to the decoder.

The correction matrix calculating unit 25-2 calculates a correction matrix $M_2$ by using the channel matrix H calculated by the channel matrix calculating unit 21, the weight w of the chip equalizer calculated by the weight calculating unit 24, the power ratio $E_c/I_{or2}$, the spreading factor $SF_2$, and the number of multi codes $N_{code2}$. By multiplying the inverse matrix of the correction matrix $M_2$ calculated by the correction matrix calculating unit 25-2 by the reception signal sequences equalized by the chip equalizer 26, the correction unit 27-2 corrects the reception signal sequences equalized by the chip equalizer 26. Then, the de-spreading processing unit 28-2 performs, on the basis of the spreading factor $SF_2$, the de-spreading on the reception signal sequences corrected by the correction unit 27-2 and then outputs the reception signal sequences that have been subjected to the de-spreading to the decoder.

FIG. 5 is a schematic diagram illustrating an example of the chip equalizer 26. For example, in the receiving device 10 in the 2×2 MIMO system, for example, as illustrated in FIG. 5, the chip equalizer 26 that includes four FIR filters 260-1 to 260-4 is used. Each of the FIR filters 260-1 to 260-4 includes a plurality of taps 261. In the second embodiment, each of the FIR filters 260-1 to 260-4 includes, for example, 15 taps 261.

Here, if reception signal sequences with different spreading factors are demodulated in parallel, it is conceivable to provide a chip equalizer for each spreading factor. When a chip equalizer is provided for two different spreading factors, if the number of taps of the FIR filter in the chip equalizer is 15, two chip equalizers each having 15×4 taps are provided. In an n×n MIMO system, two chip equalizers having 15×$n^2$ taps are provided.

In contrast, in the second embodiment, both the correction matrices $M_1$ and $M_2$ calculated by the correction matrix calculating units 25-1 and 25-2, respectively, are 2×2 matrices in, for example, the 2×2 MIMO system. Consequently, when the inverse matrix of the correction matrix $M_1$ or $M_2$ is multiplied by two sets of reception signal sequences equalized by the chip equalizer 26, the number of times of multiplication is four. The number of times of multiplication of four is the same amount of computation implemented by the four taps 261 enclosed by a broken line 262 in the chip equalizer 26 illustrated in FIG. 5.

In the second embodiment, for example, as illustrated in FIG. 4, equalization of the reception signal sequences is performed by the chip equalizer 26, the correction unit 27-1 that corrects the spreading factor $SF_1$, and the correction unit 27-2 that corrects the spreading factor $SF_2$. The chip equalizer 26 includes 15×4 taps. Furthermore, the correction process performed on the reception signals by the correction units 27-1 and 27-2 corresponds to the 1×4 taps. In the n×n MIMO system, an amount of equalizing the reception signal sequences in the second embodiment corresponds to the sum of the amount of process performed by the chip equalizer 26 that includes $15 \times n^2$ taps and the amount of process performed by the correction units 27-1 and 27-2 that correspond to $1 \times n^2$ taps.

FIG. 6 is a schematic diagram illustrating a difference between the amounts of processes. As illustrated in FIG. 6, in the conventional method in which a chip equalizer is provided for each spreading factor, when the reception signal sequences with the two types of spreading factors are demodulated in parallel, the amount of process is 30 taps× $n^2$. In contrast, in the second embodiment, as illustrated in FIG. 6, the sum of the amount of process performed by the chip equalizer 26, the amount of process performed by the correction unit 27-1, and the amount of process performed by the correction unit 27-2 corresponds to $17 \times n^2$ taps. Consequently, the communication processor 20 according to the second embodiment can reduce the amount of process performed by the communication processor 20 when compared with the conventional method.

Advantage of the Second Embodiment

With the communication processor 20 according to the second embodiment, it is possible to reduce an amount of process when reception signal sequences with a plurality of spreading factors SFs are demodulated in parallel.

[c] Third Embodiment

The communication processor 20 according to a third embodiment differs from the communication processor 20 according to the first embodiment in that the reception signal sequences that have been subjected to the de-spreading are corrected by using the correction matrix M.

Communication Processor 20

Figure 7:
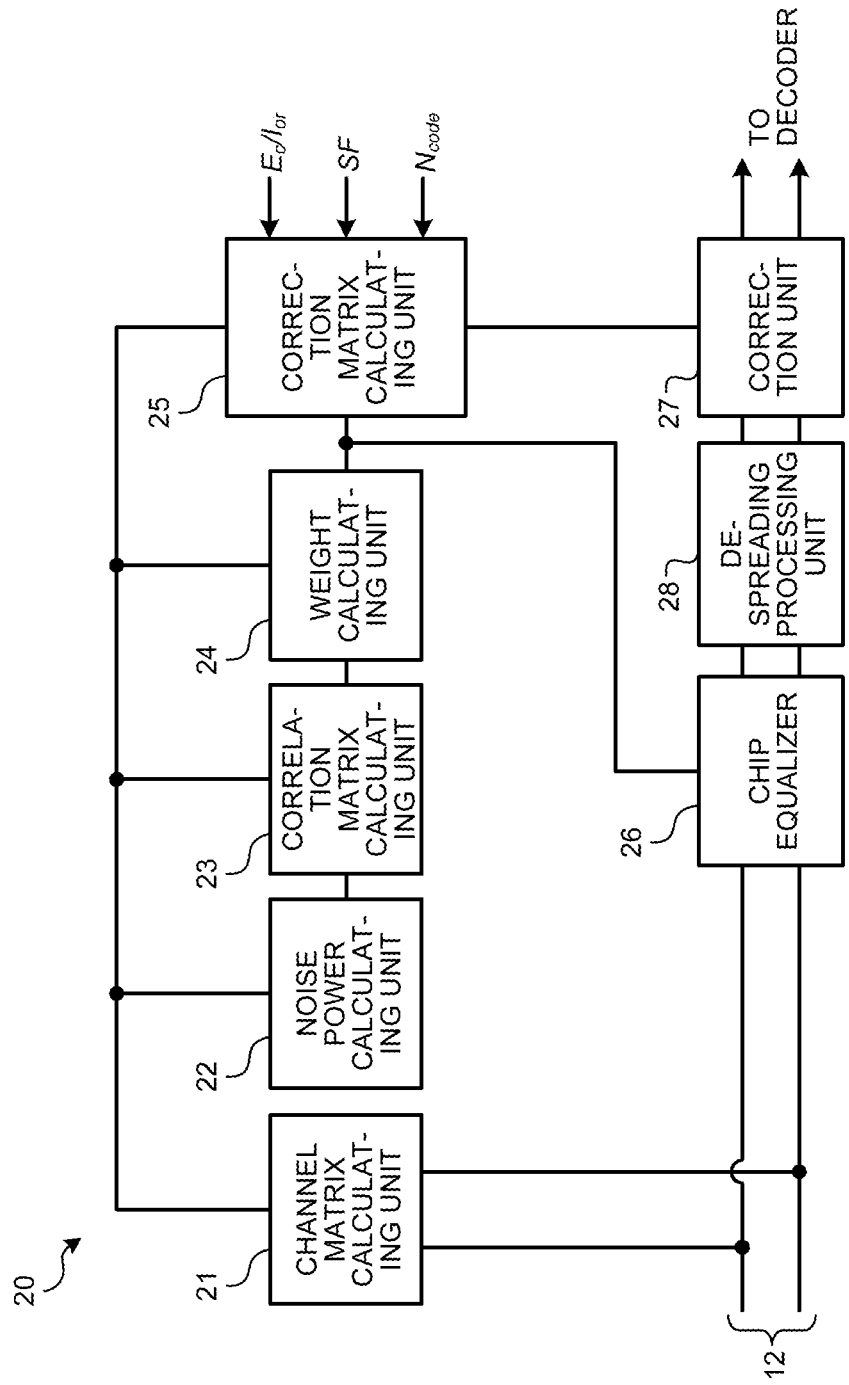
FIG. 7 is a block diagram illustrating an example of a communication processor according to a third embodiment.

FIG. 7 is a block diagram illustrating an example of the communication processor 20 according to the third embodiment. The communication processor 20 according to the third embodiment includes the channel matrix calculating unit 21, the noise power calculating unit 22, the correlation matrix calculating unit 23, the weight calculating unit 24, the correction matrix calculating unit 25, the chip equalizer 26, the correction unit 27, and the de-spreading processing unit 28. The components illustrated in FIG. 7 having the same reference numerals as those illustrated in FIG. 2 have the same or similar functions as those illustrated in FIG. 2 except for the following points described below; therefore, descriptions thereof will be omitted.

In both the correction process and the de-spreading process, in principle, the order of computation may be changed. Accordingly, with the communication processor 20 according to the third embodiment, de-spreading is performed on the reception signal sequences equalized by the chip equalizer 26 and the reception signal sequences that have been subjected to the de-spreading are corrected by the inverse matrix of the correction matrix M. With this configuration, if the number of multi codes is particularly small, the amount of computation of the correction process can be reduced.

Advantage of the Third Embodiment

With the communication processor 20 according to the third embodiment, the amount of computation in the demodulation process can be reduced.

[d] Fourth Embodiment

The communication processor 20 according to a fourth embodiment is used for, for example, a base station or the like that demodulates uplink signals in Long Term Evolution (LTE, registered trademark). In LTE, a DFT-S-OFDMA method is used for the uplink signals. The DFT-S-OFDMA method is a method that uses signals obtained by mapping single carrier signals onto specific subcarriers in Orthogonal Frequency Division Multiplexing (OFDM).

Communication Processor 20

Figure 8:
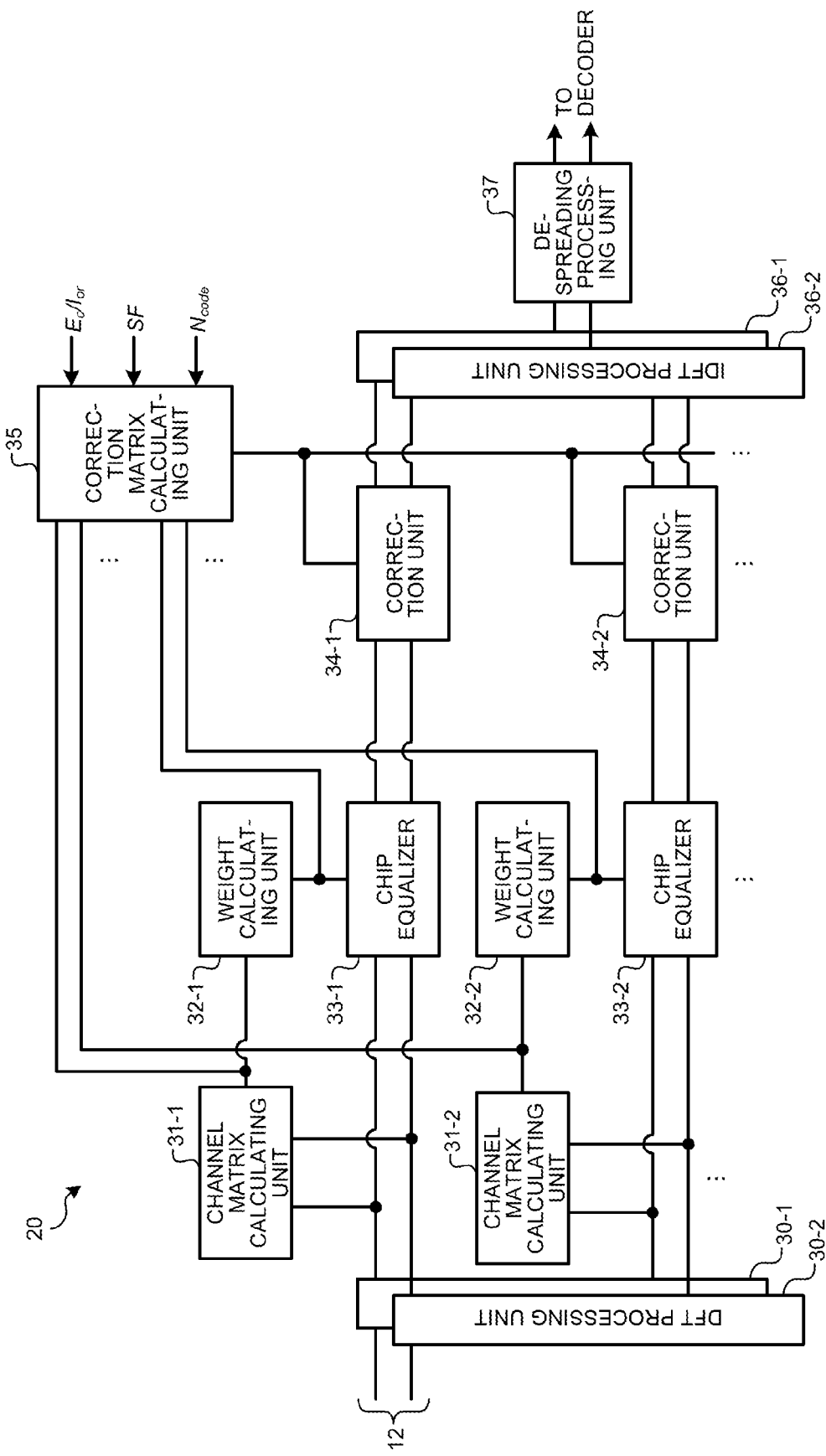
FIG. 8 is a block diagram illustrating an example of a communication processor according to a fourth embodiment.

FIG. 8 is a block diagram illustrating an example of the communication processor 20 according to the fourth embodiment. The communication processor 20 according to the fourth embodiment includes a plurality of Discrete Fourier Transformation (DFT) processing units 30-1 and 30-2, a plurality of channel matrix calculating units 31-1 and 31-2, and a plurality of weight calculating units 32-1 and 32-2. Furthermore, the communication processor 20 according to the fourth embodiment includes a plurality of chip equalizers 33-1 and 33-2, a plurality of correction units 34-1 and 34-2, and a correction matrix calculating unit 35. Furthermore, the communication processor 20 according to the fourth embodiment includes a plurality of Inverse Discrete Fourier Transform (IDFT) processing units 36-1 and 36-2 and a de-spreading processing unit 37. Hereinafter, the DFT processing units 30-1 and 30-2 are generally referred to as DFT processing units 30 when each of them is not distinguished from one another. The channel matrix calculating units 31-1 and 31-2 are generally referred to as channel matrix calculating units 31 when each of them is not distinguished from one another. The weight calculating units 32-1 and 32-2 are generally referred to as weight calculating units 32 when each of them is not distinguished from one another. The chip equalizers 33-1 and 33-2 are generally referred to as chip equalizers 33 when each of them is not distinguished from one another. The correction units 34-1 and 34-2 are generally referred to as correction units 34 when each of them is not distinguished from one another. The IDFT processing units 36-1 and 36-2 are generally referred to as IDFT processing units 36 when each of them is not distinguished from one another.

Each of the DFT processing units 30-1 and 30-2 converts each of the plurality of the reception signal sequences to signals in the frequency domain by using DFT. Furthermore, each of the IDFT processing units 36-1 and 36-2 converts the reception signal sequences for subcarriers corrected by each of the correction units 34 to signals in the time domain by using IDFT. The de-spreading processing unit 37 performs, on the basis of the spreading factor SF, the de-spreading, on the reception signal sequences that have been subjected to the IDFT process by each of the IDFT processing units 36 and outputs the reception signal sequences that have been subjected to the de-spreading to the decoder.

The channel matrix calculating units 31-1 and 31-2, the weight calculating units 32-1 and 32-2, the chip equalizers 33-1 and 33-2, and the correction units 34-1 and 34-2 are provided for each subcarrier. In the following, a description will be given of a process performed on a single subcarrier.

The channel matrix calculating units 31 calculates a channel matrix H for each subcarrier. The weight calculating unit 32 calculates a weight w of the chip equalizer for each subcarrier by using the channel matrix H. By using the weight w of the equalizer calculated by the weight calculating unit 32, a chip equalizer 33 equalizes, for each sub channel, the reception signal sequences that have been subjected to the DFT process. In the 2×2 MIMO system, only the computation of the 2×2 matrix is needed for the computation that is used for an equalizing process. Consequently, when compared with an equalizing process performed in the time domain, the size of a matrix used for the computation is small and thus the computational efficiency is high. Furthermore, a conventionally used chip equalizer may be used for the chip equalizer 33.

By using the channel matrix H calculated by each of the channel matrix calculating units 31, the weight w of the chip equalizer calculated by each of the weight calculating units 32, the power ratio $E_c/I_{or}$, the spreading factor SF, and the number of multi codes $N_{code}$ the correction matrix calculating unit 35 calculates a correction matrix M from, for example, an expression (22) below:

$$M = I + \left(\frac{N_{SF}\left(\frac{E_c}{I_{or}}\right)}{N_{code}} - 1\right)\left(\frac{1}{N_{DFT}}\right)\sum_{k=1}^{N_{DFT}} \underline{H}_k^H \underline{W}_k \quad (22)$$

where, $N_{DFT}$ represents the size of the DFT. $\underline{H}_k$ indicates the channel matrix obtained at each subcarrier k. $\underline{W}_k$ indicates the weight matrix obtained at each subcarrier k. $\underline{H}_k$ and $\underline{W}_k$ become, in the 2×2 MIMO system, 2×2 matrix (here, variables indicating the values in the frequency domain is represented by the underlines).

By multiplying the inverse matrix of the correction matrix M calculated by the correction matrix calculating unit 35 by the reception signal sequences equalized by the chip equalizer 33, the correction unit 34 corrects the reception signal sequences equalized by the chip equalizer 33. Consequently, reception signals that have been subjected to the de-spreading by the correction unit 34 can be optimized such that the average error power becomes the minimum and thus the receiving performance can be improved.

Advantage of the Fourth Embodiment

With the communication processor 20 according to the fourth embodiment, in the demodulation process in the DFT-S-OFDMA method, the chip equalizer 33 that is the same as that used in the conventional method. Consequently, it is possible to suppress an increase in manufacturing cost for the communication processor 20 for improving the receiving performance in the MIMO system.

[e] Fifth Embodiment

The communication processor 20 according to a fifth embodiment differs from the communication processor 20 according to the fourth embodiment in that, in the demodulation process in the DFT-S-OFDMA method, the reception signal sequences with different spreading factors are modulated in parallel.

Communication Processor 20

Figure 9:
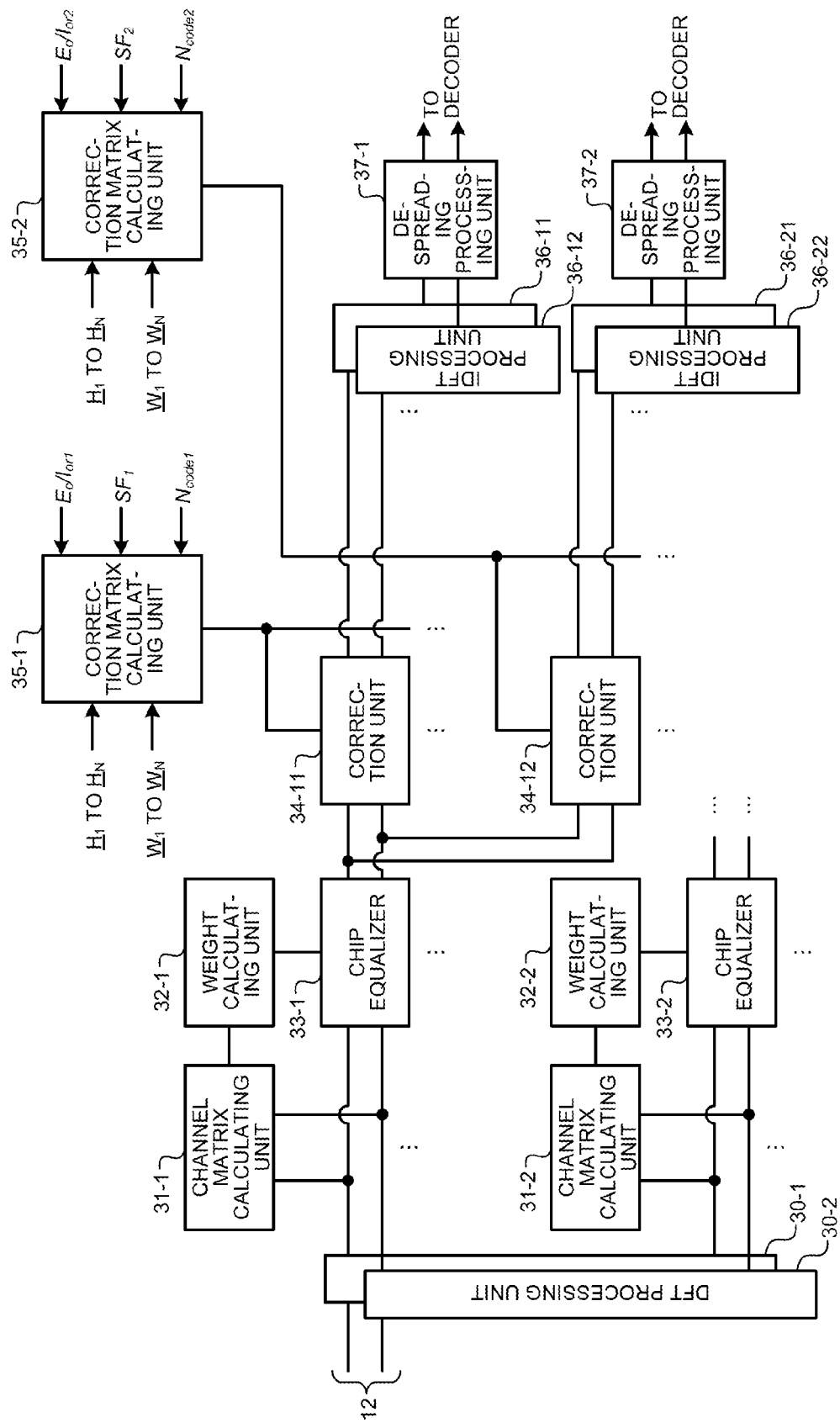
FIG. 9 is a block diagram illustrating an example of a communication processor according to a fifth embodiment.

FIG. 9 is a block diagram illustrating an example of the communication processor 20 according to the fifth embodiment. The communication processor 20 according to the fifth embodiment includes a plurality of the DFT processing units 30-1 and 30-2, the plurality of the channel matrix calculating units 31-1 and 31-2, a plurality of the weight calculating units 32-1 and 32-2, and a plurality of the chip equalizers 33-1 and 33-2. Furthermore, the communication processor 20 according to the fifth embodiment includes a plurality of correction units 34-11 and 34-12 and a plurality of correction matrix calculating units 35-1 and 35-2. Furthermore, the communication processor 20 according to the fifth embodiment includes a plurality of IDFT processing units 36-11, 36-12, 36-21, and 36-22 and a plurality of de-spreading processing units 37-1 and 37-2. The components illustrated in FIG. 9 having the same reference numerals as those illustrated in FIG. 8 have the same or similar functions as those illustrated in FIG. 8 except for the following points described below; therefore, descriptions thereof will be omitted.

In the fifth embodiment, the correction matrix calculating units 35 are installed for spreading factors SFs each of which performs demodulation in parallel. By using the channel matrix H calculated by each of the channel matrix calculating units 31, the weight w of the chip equalizer calculated by each of the weight calculating units 32, the power ratio $E_c/I_{or1}$, the spreading factor $SF_1$, and the number of multi codes $N_{code1}$, the correction matrix calculating unit 35-1 calculates a correction matrix $M_1$ by using, for example, an expression (22) described above.

By multiplying the inverse matrix of the correction matrix $M_1$ calculated by the correction matrix calculating unit 35-1 by the reception signal sequences equalized by the chip equalizer 33-1, the correction unit 34-11 corrects the reception signal sequences equalized by the chip equalizer 33-1. Then, each of the IDFT processing units 36-11 and 36-12 performs the IDFT process on the reception signal sequences for the subcarriers that have been corrected by the inverse matrix of the correction matrix M. The de-spreading processing unit 37-1 performs, on the basis of the spreading factor $SF_1$, the de-spreading on the reception signal sequences that have been subjected to the IDFT process by each of the IDFT processing units 36-11 and 36-12 and then outputs the reception signal sequences subjected to the de-spreading to the decoder.

Furthermore, by using the channel matrix H calculated by each of the channel matrix calculating units 31, the weight w of the chip equalizer calculated by each of the weight calculating units 32, the power ratio $E_c/I_{or2}$, the spreading factor $SF_2$, and the number of multi codes $N_{code2}$, the correction matrix calculating unit 35-2 calculates the correction matrix $M_2$ by using, for example, the expression (22) described above.

By multiplying the inverse matrix of the correction matrix $M_2$ calculated by the correction matrix calculating unit 35-2 by the reception signal sequences equalized by the chip equalizer 33-1, the correction unit 34-12 corrects the reception signal sequences equalized by the chip equalizer 33-1. Then, each of the IDFT processing units 36-21 and 36-22 performs the IDFT process on the reception signal sequences for the subcarriers corrected by the inverse matrix of the correction matrix $M_2$. The de-spreading processing unit 37-2 performs, on the basis of the spreading factor $SF_2$, the de-spreading on the reception signal sequences that have been subjected by the IDFT process by the IDFT processing units 36-21 and 36-22 and then outputs the reception signal sequences that have been subjected to the de-spreading to the decoder.

Advantage of the Fifth Embodiment

With the communication processor 20 according to the fifth embodiment, in the demodulation process in the DFT-S-OFDMA method, it is possible to reduce an amount of process when reception signal sequences with a plurality of spreading factors SFs are demodulated in parallel.

[f] Sixth Embodiment

The communication processor 20 according to a sixth embodiment differs from the communication processor 20 according to the fourth embodiment in that, in the demodulation process in the DFT-S-OFDMA method, the reception signal sequences that have been subjected to the de-spreading are corrected by using the correction matrix M.

Communication Processor 20

Figure 10:
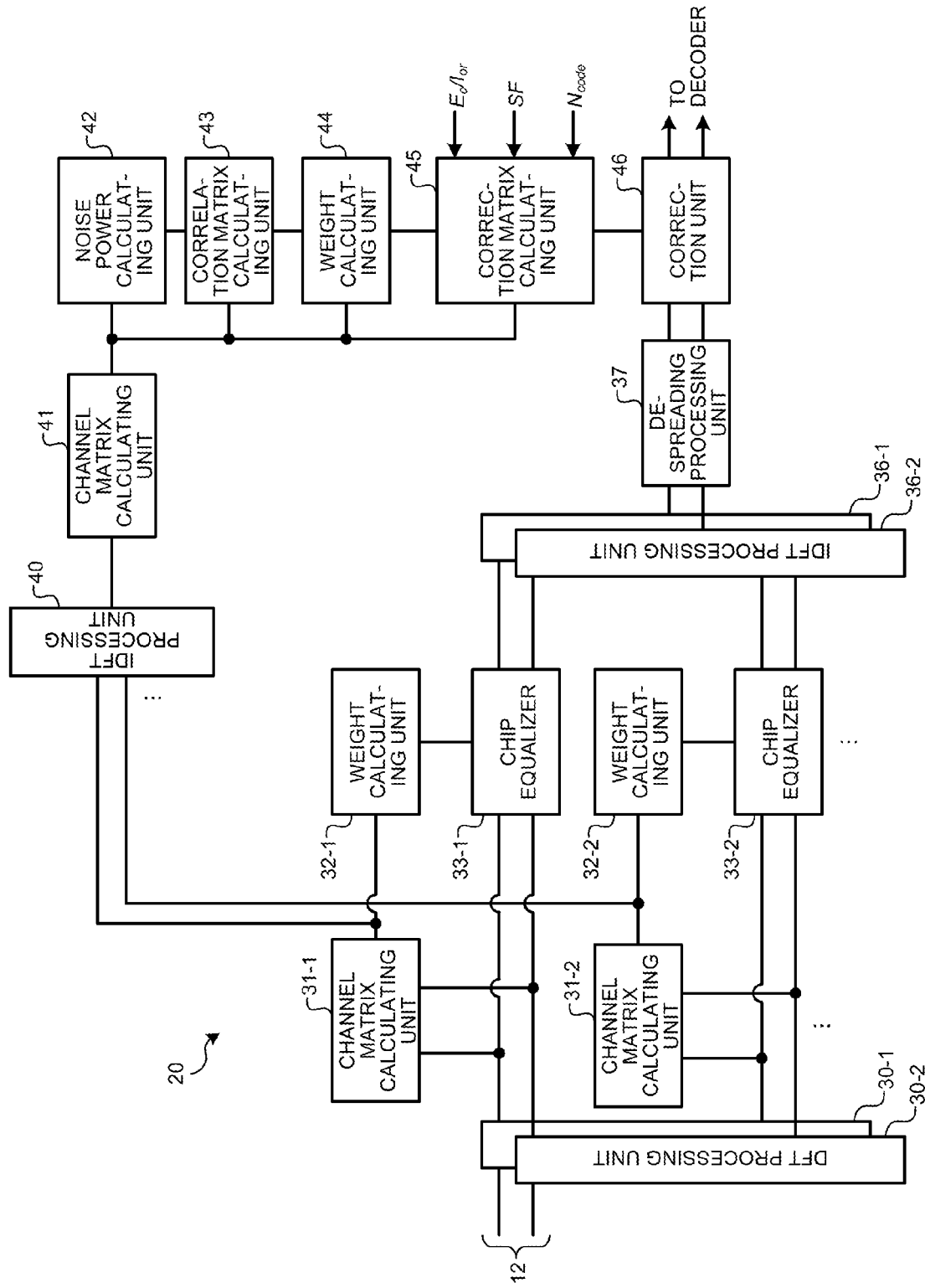
FIG. 10 is a block diagram illustrating an example of a communication processor according to a sixth embodiment.

FIG. 10 is a block diagram illustrating an example of the communication processor 20 according to the sixth embodiment. The communication processor 20 according to the sixth embodiment includes the plurality of the DFT processing units 30-1 and 30-2, the plurality of the channel matrix calculating units 31-1 and 31-2, the plurality of the weight calculating units 32-1 and 32-2, and the plurality of the chip equalizers 33-1 and 33-2. Furthermore, the communication processor 20 according to the sixth embodiment includes the plurality of the IDFT processing units 36-1 and 36-2 and the de-spreading processing unit 37. Furthermore, the communication processor 20 according to the sixth embodiment includes an IDFT processing unit 40, a channel matrix calculating unit 41, a noise power calculating unit 42, a correlation matrix calculating unit 43, a weight calculating unit 44, a correction matrix calculating unit 45, and a correction unit 46. The components illustrated in FIG. 10 having the same reference numerals as those illustrated in FIG. 8 have the same or similar functions as those illustrated in FIG. 8 except for the following points described below; therefore, descriptions thereof will be omitted.

The IDFT processing unit 40 performs the IDFT process, in the time domain, on the channel matrix H calculated, in the frequency domain, by each of the channel matrix calculating units 31-1 and 31-2. The channel matrix calculating unit 41 calculates the channel matrix H in the time domain by using the data converted to the time domain by the IDFT processing unit 40. The noise power calculating unit 42 calculates the noise power $\sigma^2$ by using the channel matrix H calculated by the channel matrix calculating unit 41. The correlation matrix calculating unit 43 calculates a correlation matrix R by using the channel matrix H calculated by the channel matrix calculating unit 41 and the noise power $\sigma^2$ calculated by the noise power calculating unit 42.

The weight calculating unit 44 calculates a weight w of the chip equalizer by using the channel matrix H calculated by the channel matrix calculating unit 41 and the correlation matrix R calculated by the correlation matrix calculating unit 43. The correction matrix calculating unit 45 calculates a correction matrix M by using the channel matrix H calculated by the channel matrix calculating unit 41, the weight w of the chip equalizer calculated by the weight calculating unit 44, the power ratio $E_c/I_{or}$, the spreading factor SF, and the number of multi codes $N_{code}$. By multiplying the inverse matrix of the correction matrix M calculated by the correction matrix calculating unit 45 by the reception signal sequences that have been subjected to the de-spreading by the de-spreading processing unit 37, the correction unit 46 corrects the reception signal sequences subjected to the de-spreading by the de-spreading processing unit 37.

The efficiency of the de-spreading process is better if the process is performed in the time domain, if the correction process is performed after the de-spreading has been performed, the correction matrix M in the time domain is obtained. Accordingly, in the sixth embodiment, the channel matrix H obtained in the frequency domain is converted to the time domain by the IDFT, the correction matrix M in the time domain is obtained from the converted data, and performs the correction process. Consequently, even if an equalizer in the frequency domain is used, it is possible to reduce the correction process if the number of multi codes is small.

Advantage of the Sixth Embodiment

With the communication processor 20 according to the sixth embodiment, in the demodulation process in the DFT-S-OFDMA method, the amount of computation in the demodulation process can be reduced.

[g] Seventh Embodiment

The communication processor 20 according to a seventh embodiment differs from the communication processor 20 according to the fourth embodiment in that, in the demodulation process in the DFT-S-OFDMA method, the reception signal sequences that have been subjected to the de-spreading are corrected by using the correction matrix M calculated in the frequency domain. For the IDFT process, the de-spreading process, and the correction process, if the order of computation is changed, the same result can be obtained. In other words, the correction process on the basis of the correction matrix M obtained in the frequency domain may also be performed on the reception signal sequences that have been subjected to the de-spreading process.

Communication Processor 20

Figure 11:
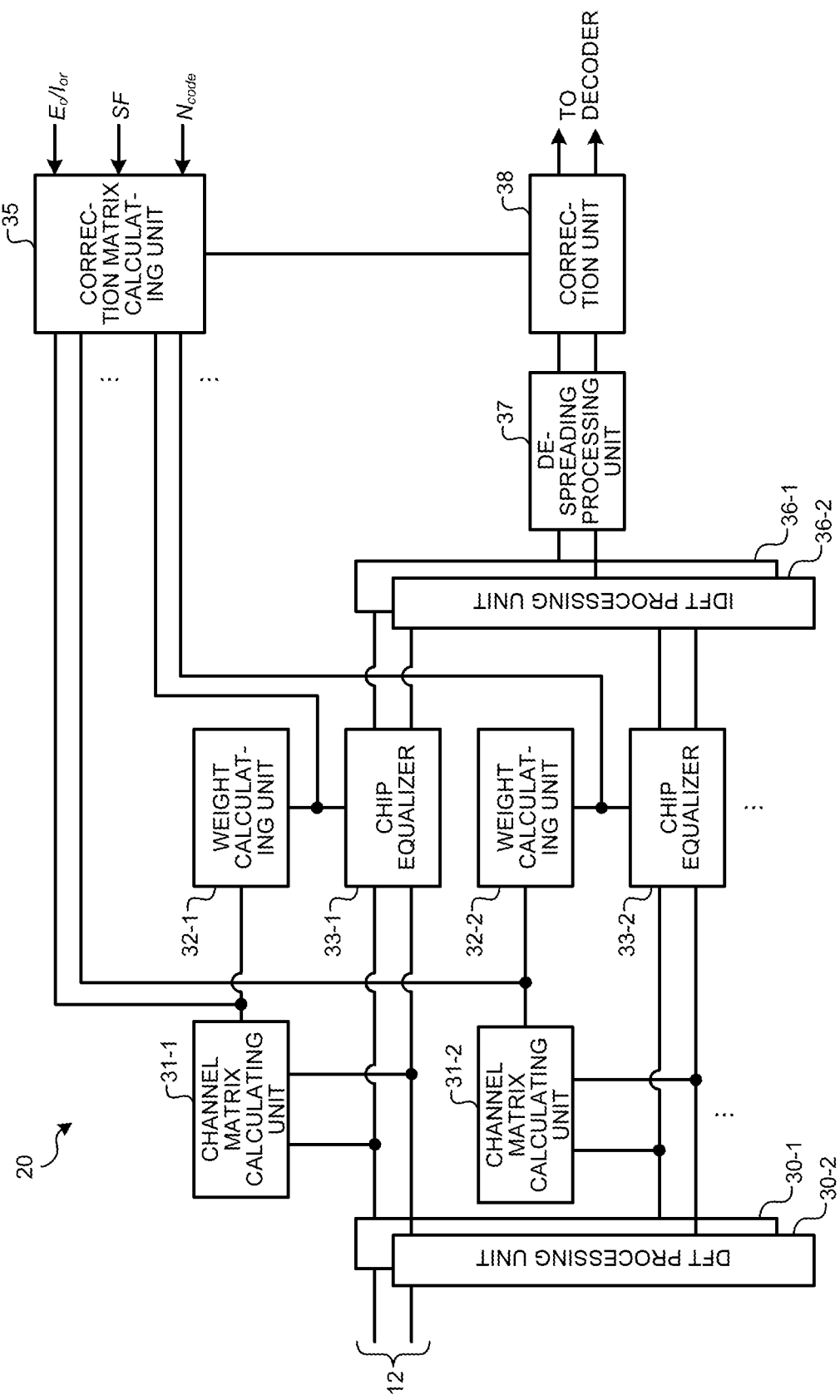
FIG. 11 is a block diagram illustrating an example of a communication processor according to a seventh embodiment.

FIG. 11 is a block diagram illustrating an example of the communication processor 20 according to the seventh embodiment. The communication processor 20 according to the seventh embodiment includes the plurality of the DFT processing units 30-1 and 30-2, the plurality of the channel matrix calculating units 31-1 and 31-2, the plurality of the weight calculating units 32-1 and 32-2, and the plurality of the chip equalizers 33-1 and 33-2. Furthermore, the communication processor 20 according to the seventh embodiment includes the correction matrix calculating unit 35, the plurality of the IDFT processing units 36-1 and 36-2, the de-spreading processing unit 37, and a correction unit 38. The components illustrated in FIG. 11 having the same reference numerals as those illustrated in FIG. 8 have the same or similar functions as those illustrated in FIG. 8 except for the following points described below; therefore, descriptions thereof will be omitted.

By multiplying the inverse matrix of the correction matrix M calculated in the frequency domain by the correction matrix calculating unit 35 by the reception signal sequences that have been subjected to the de-spreading by the de-spreading processing unit 37, the correction unit 38 corrects the reception signal sequences that have been subjected to the de-spreading by the de-spreading processing unit 37.

Advantage of the Seventh Embodiment

With the communication processor 20 according to the seventh embodiment, in the demodulation process in the DFT-S-OFDMA method, the amount of computation in the demodulation process can be reduced.

[h] Eighth Embodiment

Receiving Device 10

Figure 12:
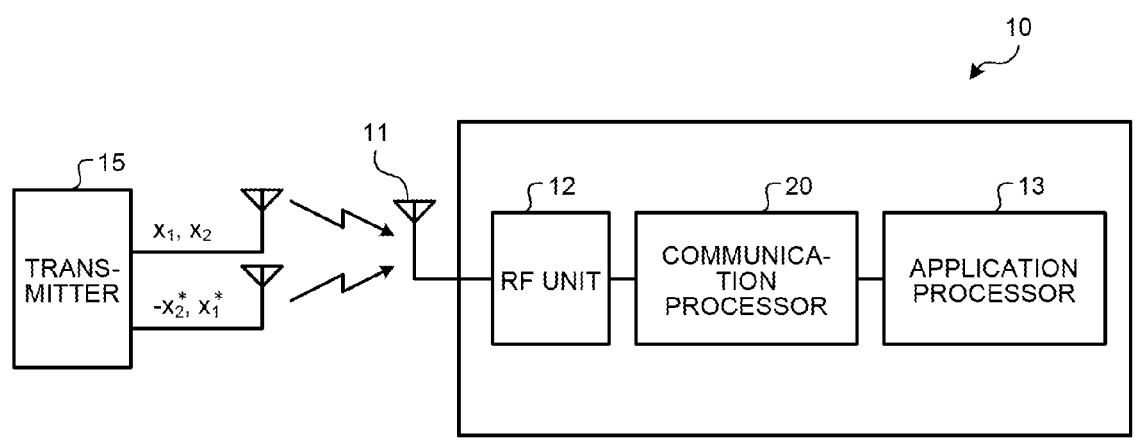
FIG. 12 is a block diagram illustrating an example of a receiving device according to an eighth embodiment.

FIG. 12 is a block diagram illustrating an example of the receiving device 10 according to an eighth embodiment. For example, as illustrated in FIG. 12, the receiving device 10 according to the eight embodiment includes a single antenna 11 and receives transmission signals sent by a Space-time block coding based transmit diversity (STTD) method.

In STTD, for example, as illustrated in FIG. 12, a transmitter 15 on the transmission side sequentially sends, from one of the antenna out of two antennas, transmission signal vectors $x_1$ and $x_2$, and, at the same time, sequentially sends, from the other antennas, $-x_2^*$ and $x_1^*$ ($x^*$ represents the complex conjugate of x). On the reception side, the sent signals are received by using the single antenna 11 (in other words, the MIMO system is not used); however, by performing an appropriate demodulation process on the reception signal vectors $y_1$ and $y_2$ that are temporally adjacent, the transmission signal vectors $x_1$ and $x_2$ can be correctly separated.

Here, when a channel matrix $H_1$ of a propagation path from one of the transmission antennas and a channel matrix $H_2$ of a propagation path from the other one of the transmission antennas are used, the reception signal vectors $y_1$ and $y_2$ can be represented as below if noise is ignored.

$$y_1 = H_1 x_1 + H_2(-x^*_2) \tag{23}$$

$$y_2 = H_1 x_2 + H_2 x^*_1 \tag{24}$$

Expressions (23) and (24) above are simplified as follows;

$$\begin{pmatrix} y_1 \\ y_2^* \end{pmatrix} = H_T \begin{pmatrix} x_1 \\ x_2^* \end{pmatrix} \tag{25}$$

$$H_T = \begin{pmatrix} H_1 & -H_2 \\ H_2^* & H_1^* \end{pmatrix} \tag{26}$$

As is clear from expressions (25) and (26) above, if the channel matrix is defined to be $H_T$, this can be conceived to be the same as the MIMO system as a matter of form.

Communication Processor 20

Figure 13:
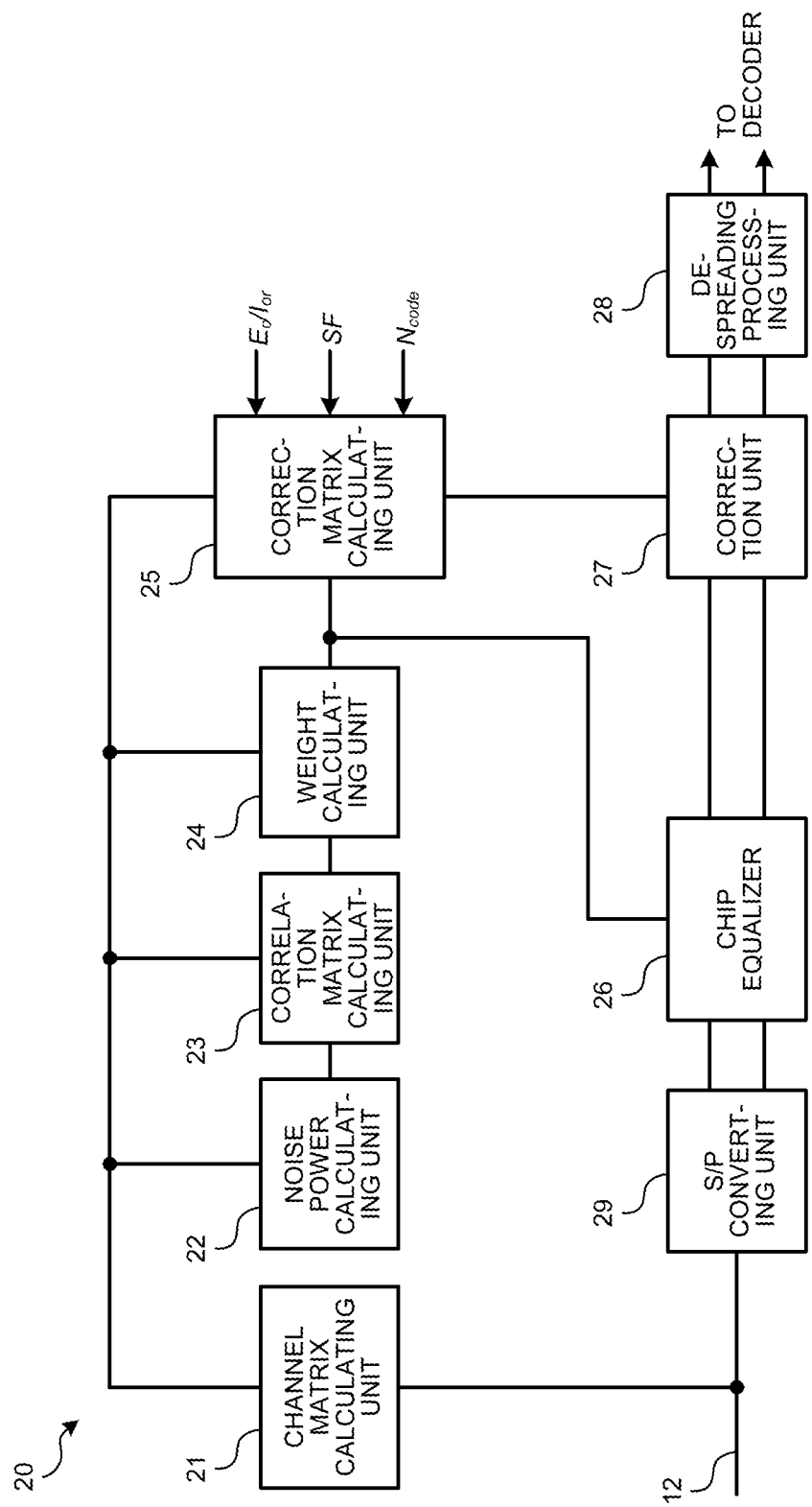
FIG. 13 is a block diagram illustrating an example of a communication processor according to the eighth embodiment.

FIG. 13 is a block diagram illustrating an example of the communication processor 20 according to the eighth embodiment. The communication processor 20 according to the eighth embodiment includes the channel matrix calculating unit 21, the noise power calculating unit 22, the correlation matrix calculating unit 23, the weight calculating unit 24, and the correction matrix calculating unit 25. Furthermore, the communication processor 20 according to the eighth embodiment includes the chip equalizer 26, the correction unit 27, the de-spreading processing unit 28, and a serial/parallel (S/P) converting unit 29. The components illustrated in FIG. 13 having the same reference numerals as those illustrated in FIG. 2 have the same or similar functions as those illustrated in FIG. 2 except for the following points described below; therefore, descriptions thereof will be omitted.

The channel matrix calculating unit 21 calculates the channel matrix $H_T$ indicated by the expression (26) described above. The noise power calculating unit 22 calculates the noise power $\sigma^2$ by using the channel matrix $H_T$ calculated by the channel matrix calculating unit 21. The correlation matrix calculating unit 23 calculates a correlation matrix R by using the channel matrix $H_T$ calculated by the channel matrix calculating unit 21 and the noise power $\sigma^2$ calculated by the noise power calculating unit 22.

The weight calculating unit 24 calculates a weight w of the chip equalizer by using the channel matrix $H_T$ calculated by the channel matrix calculating unit 21 and the correlation matrix R calculated by the correlation matrix calculating unit 23. The correction matrix calculating unit 25 calculates a correction matrix M by using the channel matrix $H_T$ calculated by the channel matrix calculating unit 21, the weight w of the chip equalizer by the weight calculating unit 24, the power ratio $E_c/I_{or}$, the spreading factor SF, and the number of multi codes $N_{code}$.

The S/P converting unit 29 outputs, to the chip equalizer 26, the reception signal sequences output from the RF unit 12 by distributing the reception signal sequences to two reception signal sequences. The S/P converting unit 29 alternately distributes, for example, for each symbol, the reception signal sequences output from the RF unit 12 to two reception signal sequences.

Advantage of the Eighth Embodiment

With the communication processor 20 according to the eighth embodiment, in the demodulation process in the STTD method, it is possible to use the chip equalizer 26 that is the same as that conventionally used. Consequently, it is possible to suppress an increase in manufacturing cost for the communication processor 20 for improving the receiving performance in the MIMO system.

[i] Ninth Embodiment

The communication processor 20 according to a ninth embodiment differs from the communication processor 20 according to the first embodiment in that the power ratio $E_c/I_{or}$ of a pilot signal with respect to a reception signal is estimated in accordance with the number of multi codes allocated to the receiving device 10.

Communication Processor 20

Figure 14:
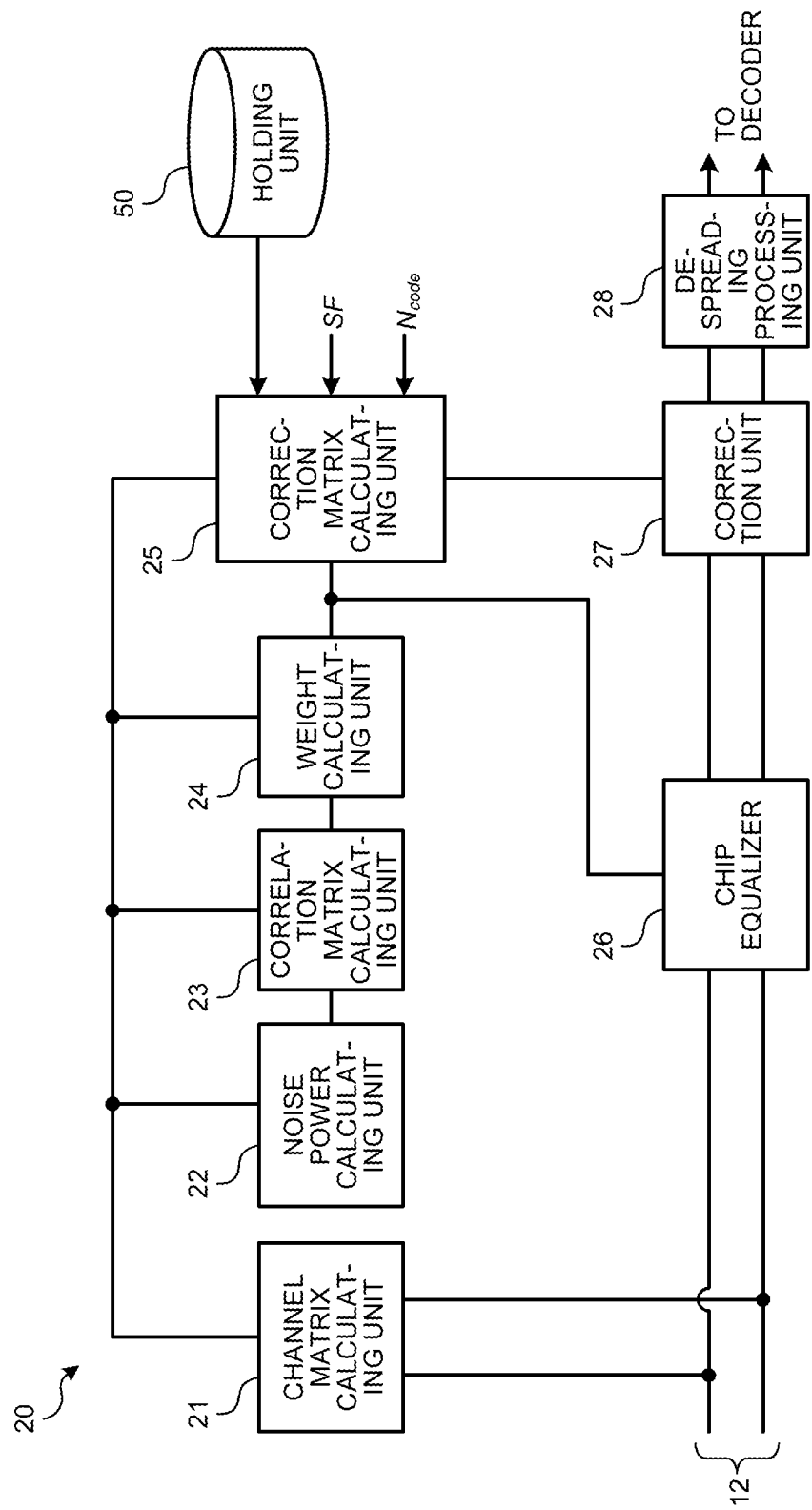
FIG. 14 is a block diagram illustrating an example of a communication processor according to a ninth embodiment.

FIG. 14 is a block diagram illustrating an example of the communication processor 20 according to the ninth embodiment. The communication processor 20 according to the ninth embodiment includes the channel matrix calculating unit 21, the noise power calculating unit 22, the correlation matrix calculating unit 23, the weight calculating unit 24, the correction matrix calculating unit 25, the chip equalizer 26, the correction unit 27, the de-spreading processing unit 28, and a holding unit 50. The components illustrated in FIG. 14 having the same reference numerals as those illustrated in FIG. 2 have the same or similar functions as those illustrated in FIG. 2 except for the following points described below; therefore, descriptions thereof will be omitted.

Figure 15:
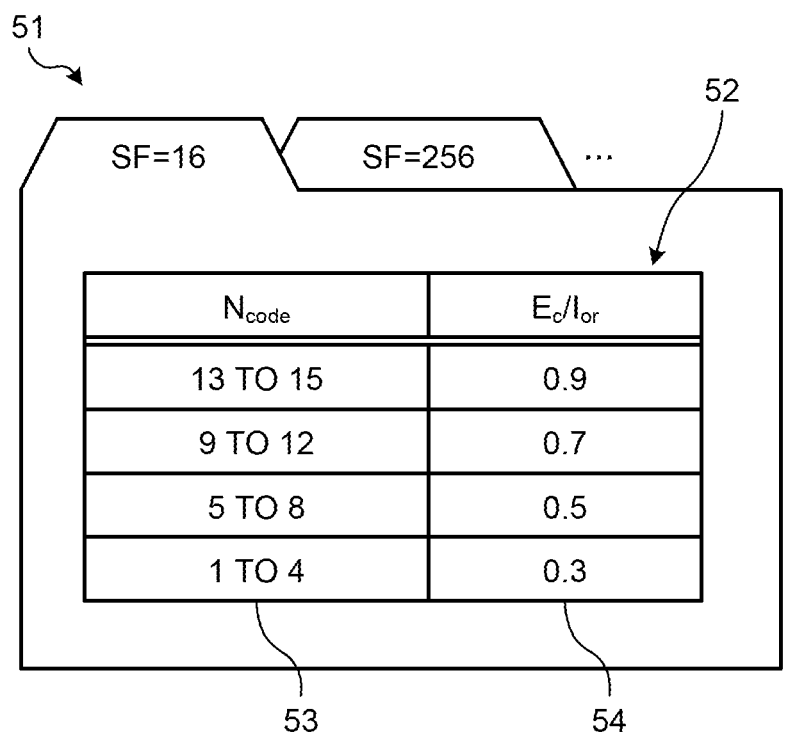
FIG. 15 is a schematic diagram illustrating an example of an association table.

The holding unit 50 holds an association table 51. In the association table 51, for example, as illustrated in FIG. 15, separate tables 52 are stored for each spreading factor SF. In each of the separate tables 52, estimated values of the $E_c/I_{or}$ 54 are stored by being associated with the range of $N_{code}$ 53 that corresponds to the number of codes of multichannel allocated to the receiving device 10.

Here, the correction matrix calculating unit 25 calculates a correction matrix M by using, in addition to the channel matrix H and the weight w of the chip equalizer, the power ratio $E_c/I_{or}$ of the pilot signal to the reception signal, the spreading factor SF, and the number of multi codes $N_{code}$. The spreading factor SF and the number of multi codes $N_{code}$ allocated to the receiving device 10 have a high possibility of being notified from the system in some way, whereas there is a possibility that $E_c/I_{or}$ is not notified from the system. For example, in HSDPA specification, $E_c/I_{or}$ is not sent as a notification to the receiving device 10, such as a mobile terminal or the like. Accordingly, the communication processor 20 estimates $E_c/I_{or}$ in some way.

Here, the number of multi codes allocated to the receiving device 10 is great indicates that a large amount of data is sent to the receiving device 10 by using a large amount of power. In other words, it is estimated that the number of multi codes allocated to the receiving device 10 is great indicates that the amount of transmission power that is used to transmit data to the receiving device 10 is also great. Accordingly, the relationship between the number of multi codes allocated to the receiving device 10 and the transmission power is previously checked and, for example, the association table illustrated in FIG. 15 is previously created and stored in the holding unit 50.

The correction matrix calculating unit 25 refers to the holding unit 50 on the basis of the spreading factor SF allocated to the receiving device 10 and specifies the association table 51 that is associated with the spreading factor SF allocated to the receiving device 10. Then, the correction matrix calculating unit 25 refers to the specified association table 51 and extracts the estimated value of $E_c/I_{or}$ that is associated with the range in which the number of multi codes $N_{code}$ allocated to the receiving device 10 is included. Then, the correction matrix calculating unit 25 calculates a correction matrix M by using the extracted estimated value of $E_c/I_{or}$.

Advantage of the Ninth Embodiment

With the communication processor 20 according to the ninth embodiment, $E_c/I_{or}$ can be estimated with a simple method.

[j] Tenth Embodiment

The communication processor 20 according to a tenth embodiment differs from the communication processor 20 according to the ninth embodiment in that an estimated value of the power ratio $E_c/I_{or}$ of the pilot signal to the reception signal is adaptively obtained.

Communication Processor 20

Figure 16:
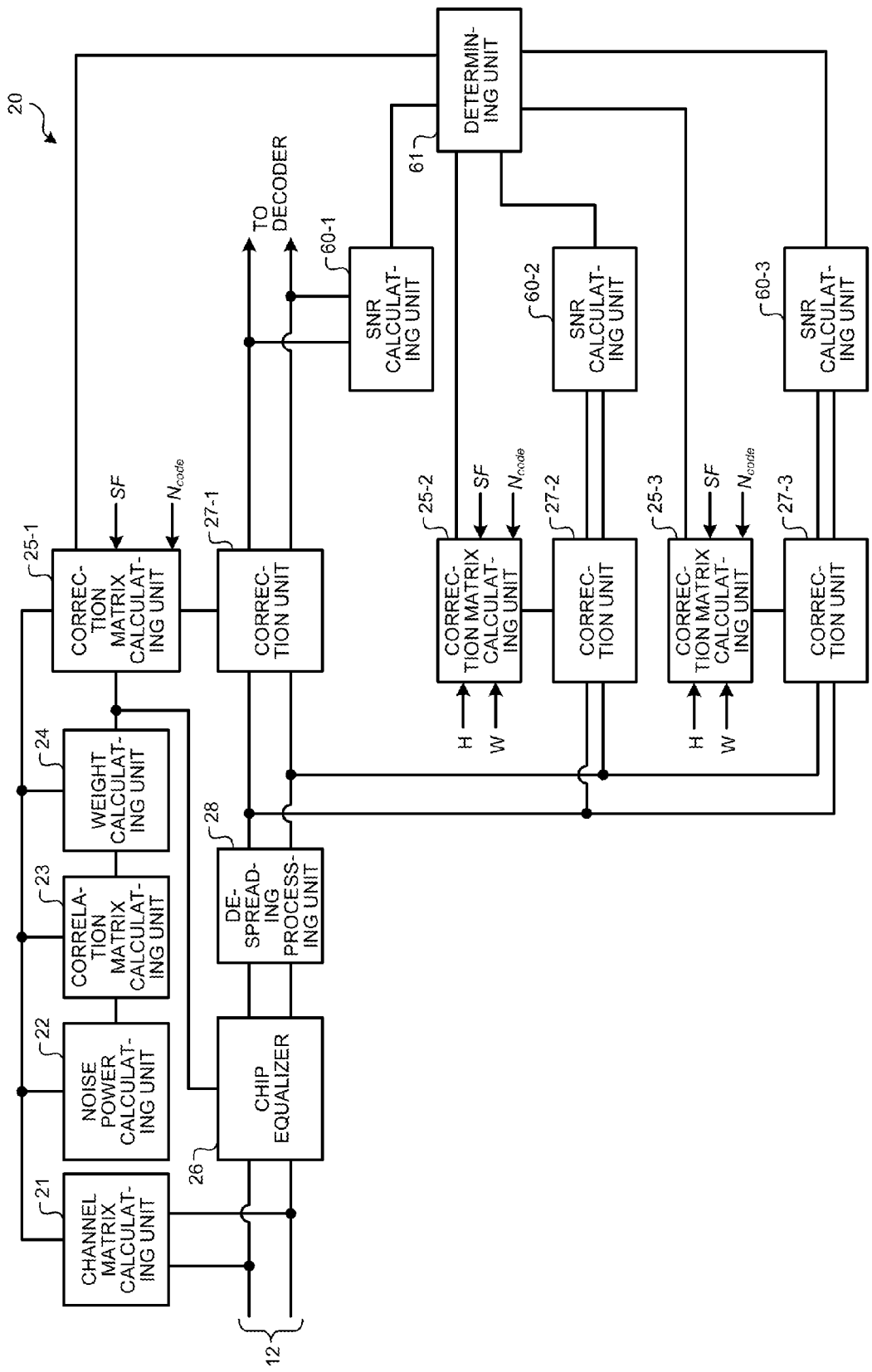
FIG. 16 is a block diagram illustrating an example of a communication processor according to a tenth embodiment.

FIG. 16 is a block diagram illustrating an example of the communication processor 20 according to the tenth embodiment. The communication processor 20 according to the tenth embodiment includes the channel matrix calculating unit 21, the noise power calculating unit 22, the correlation matrix calculating unit 23, the weight calculating unit 24, the chip equalizer 26, and the de-spreading processing unit 28. Furthermore, the communication processor 20 according to the tenth embodiment includes a plurality of the correction matrix calculating units 25-1 to 25-3, a plurality of the correction units 27-1 to 27-3, a plurality of signal to noise ratio (SNR) calculating units 60-1 to 60-3, and a determining unit 61. The components illustrated in FIG. 16 having the same reference numerals as those illustrated in FIG. 2 have the same or similar functions as those illustrated in FIG. 2 except for the following points described below; therefore, descriptions thereof will be omitted. Hereinafter, the SNR calculating units 60-1 to 60-3 are generally referred to as SNR calculating units 60 when each of them is not distinguished from one another.

Each of the correction matrix calculating units 25-1 to 25-3 calculates a correction matrix M by using the channel matrix H calculated by the channel matrix calculating unit 21, a weight w of the chip equalizer calculated by the weight calculating unit 24, the power ratio $E_c/I_{or}$, the spreading factor SF, and the number of multi codes $N_{code}$. The value of the power ratio $E_c/I_{or}$ is input from the determining unit 61.

By multiplying the inverse matrix of the correction matrix $M_1$ calculated by the correction matrix calculating unit 25-1 by the reception signal sequences that have been subjected to the de-spreading by the de-spreading processing unit 28, the correction unit 27-1 corrects the reception signal sequences that have been subjected to the de-spreading by the de-spreading processing unit 28. The reception signal sequences corrected by the correction unit 27-1 are output to the decoder.

The SNR calculating unit 60-1 calculates the SNR of the reception signal sequences corrected by the correction unit 27-1 and then outputs the calculated SNR to the determining unit 61. The SNR calculating unit 60-1 performs, on the pilot signal, for example, the demodulation process that is the same demodulation process as that performed on the data addressed to the receiving device 10; estimates signal power and noise power; and calculates the SNR.

By multiplying the inverse matrix of the correction matrix $M_2$ calculated by the correction matrix calculating unit 25-2 by the reception signal sequences that have been subjected to the de-spreading by the de-spreading processing unit 28, the correction unit 27-2 corrects the reception signal sequences that have been subjected to the de-spreading by the de-spreading processing unit 28. The SNR calculating unit 60-2 calculates the SNR of the reception signal sequences corrected by the correction unit 27-2 and then outputs the calculated SNR to the determining unit 61.

By multiplying the inverse matrix of the correction matrix $M_3$ calculated by the correction matrix calculating unit 25-3 by the reception signal sequences that have been subjected to the de-spreading by the de-spreading processing unit 28, the correction unit 27-3 corrects the reception signal sequences that have been subjected to the de-spreading by the de-spreading processing unit 28. The SNR calculating unit 60-3 calculates the SNR of the reception signal sequences corrected by the correction unit 27-2 and then outputs the calculated SNR to the determining unit 61.

The determining unit 61 inputs $E_c/I_{or}$ of a certain value to the correction matrix calculating unit 25-1. Furthermore, the determining unit 61 inputs, as $E_c/I_{or}$ to the correction matrix calculating unit 25-2, a value obtained by adding a predetermined value $\Delta a$ to $E_c/I_{or}$ that is input to the correction matrix calculating unit 25-1. Furthermore, the determining unit 61 inputs, as $E_c/I_{or}$ to the correction matrix calculating unit 25-3, a value obtained by subtracting the predetermined value $\Delta a$ from $E_c/I_{or}$ that is input to the correction matrix calculating unit 25-1. In the tenth embodiment, the symbol of $\Delta a$ represents a value of, for example, 5 to 10% of $E_c/I_{or}$ targeted for addition or subtraction.

Then, the determining unit 61 compares, at predetermined time intervals (for example, a single-frame to few-frame time periods), the SNRs calculated by the respective SNR calculating units 60-1 to 60-3 and specifies the SNR calculating unit 60 that outputs the largest SNR. Then, the determining unit 61 specifies the correction unit 27 that has corrected the reception signal sequences that are associated with the SNR calculated by the specified SNR calculating unit 60. Then, the determining unit 61 specifies the correction matrix calculating unit 25 that has calculated the correction matrix M that is used by the specified correction unit 27 to correct the reception signal sequences. Then, the determining unit 61 inputs, to the correction matrix calculating unit 25-1 at the subsequent predetermined time interval, the value of $E_c/I_{or}$ that was input to the specified correction matrix calculating unit 25.

By doing so, every time the predetermined time interval has elapsed, the SNR of the reception signal sequences that are output to the decoder approaches the maximum value and the estimated value of $E_c/I_{or}$ is converged to a value closer to the actual value. Consequently, the communication processor 20 according to the tenth embodiment can estimate $E_c/I_{or}$ with greater accuracy.

Furthermore, for the value of $E_c/I_{or}$ that is input to the correction matrix calculating unit 25-1 first time, for example, similarly to the ninth embodiment, the determining unit 61 may also use the value of $E_c/I_{or}$ that is estimated in accordance with the number of multi codes allocated to the receiving device 10.

Advantage of the Tenth Embodiment

With the communication processor 20 according to the tenth embodiment, $E_c/I_{or}$ can be estimated with greater accuracy.

[k] Eleventh Embodiment

The communication processor 20 according to an eleventh embodiment differs from the communication processor 20 according to the tenth embodiment in that an estimated value of $E_c/I_{or}$ that is used to correct the reception signal sequences that are to be decoded is adaptively obtained by being shifted at predetermined time intervals.

Communication Processor 20

Figure 17:
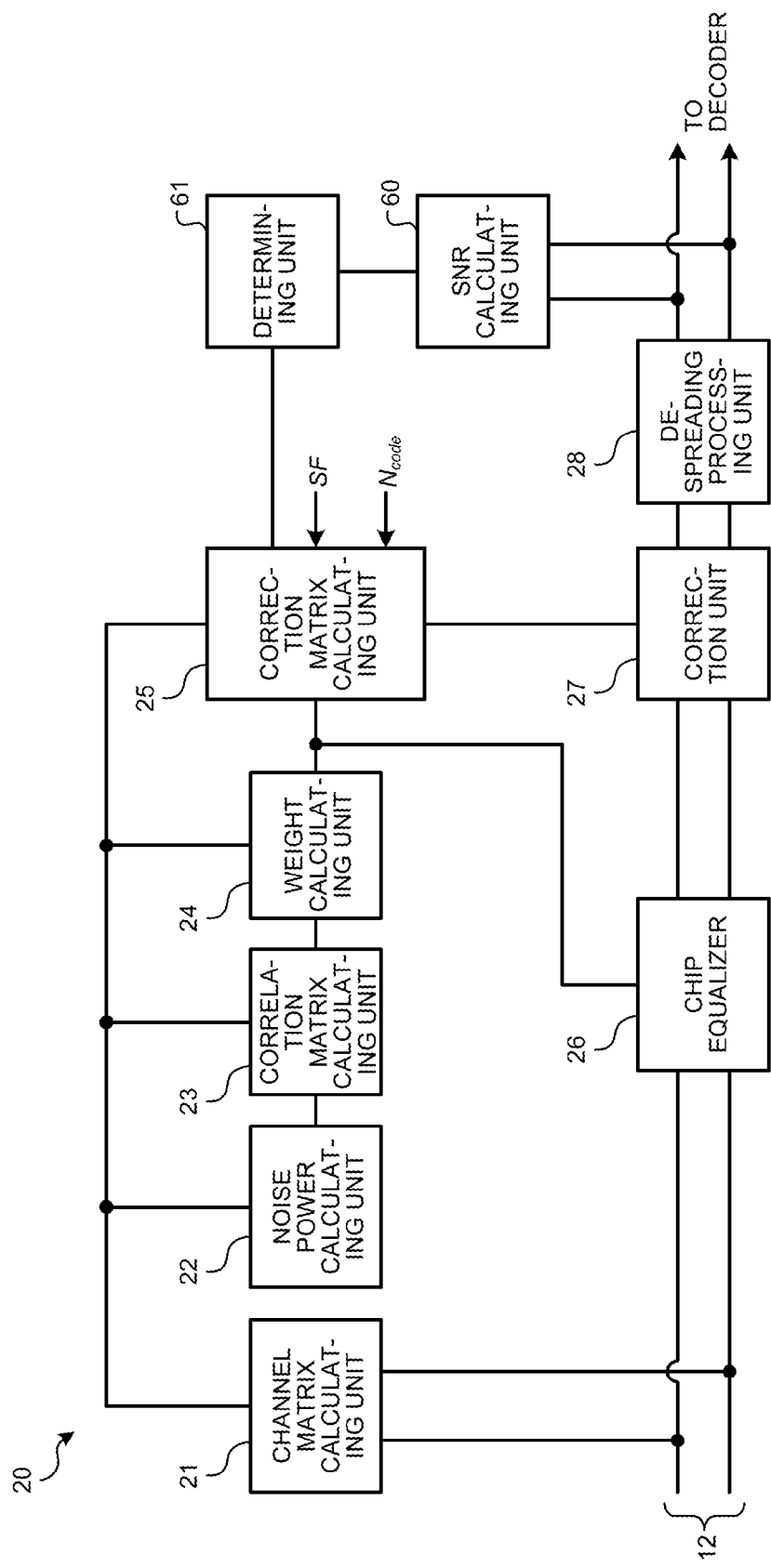
FIG. 17 is a block diagram illustrating an example of a communication processor according to an eleventh embodiment.

FIG. 17 is a block diagram illustrating an example of the communication processor 20 according to the eleventh embodiment. The communication processor 20 according to the eleventh embodiment includes the channel matrix calculating unit 21, the noise power calculating unit 22, the correlation matrix calculating unit 23, the weight calculating unit 24, the correction matrix calculating unit 25, the chip equalizer 26, the correction unit 27, the de-spreading processing unit 28, the SNR calculating unit 60, and the determining unit 61. The components illustrated in FIG. 17 having the same reference numerals as those illustrated in FIG. 16 have the same or similar functions as those illustrated in FIG. 16 except for the following points described below; therefore, descriptions thereof will be omitted.

The correction matrix calculating unit 25 calculates a correction matrix M by using the channel matrix H calculated by the channel matrix calculating unit 21, a weight w of the chip equalizer calculated by the weight calculating unit 24, $E_c/I_{or}$ that is input from the determining unit 61, the spreading factor SF, and the number of multi codes $N_{code}$. The SNR calculating unit 60 calculates the SNR of the reception signal sequences that have been subjected to the de-spreading by the de-spreading processing unit 28 and then outputs the calculated SNR to the determining unit 61.

The determining unit 61 inputs $E_c/I_{or}$ related to a certain value to the correction matrix calculating unit 25. Then, the determining unit 61 refers to, at predetermined time intervals (for example, a single-frame to few-frame time periods), the SNR calculated by the SNR calculating unit 60. Then, the determining unit 61 compares the SNR referred to this time with the SNR that was referred to the last time. If the SNR referred to this time is greater than that referred to the last time, the determining unit 61 makes the same change as that made to $E_c/I_{or}$ the last time. In other words, if the determining unit 61 adds $\Delta a$ to $E_c/I_{or}$ the last time, the determining unit 61 also adds $\Delta a$ to $E_c/I_{or}$ this time. If the determining unit 61 subtracts $\Delta a$ from $E_c/I_{or}$ the last time, the determining unit 61 also subtracts $\Delta a$ from $E_c/I_{or}$ this time.

In contrast, if the SNR that is referred to this time is smaller than that referred to the last time, the determining unit 61 adds a different change as that performed on $E_c/I_{or}$ the last time. In other words, if the determining unit 61 adds $\Delta a$ to $E_c/I_{or}$ the last time, the determining unit 61 subtracts $\Delta a$ from $E_c/I_{or}$ this time. If the determining unit 61 subtracts $\Delta a$ from $E_c/I_{or}$ the last time, the determining unit 61 adds $\Delta a$ to $E_c/I_{or}$ this time.

Figure 18:
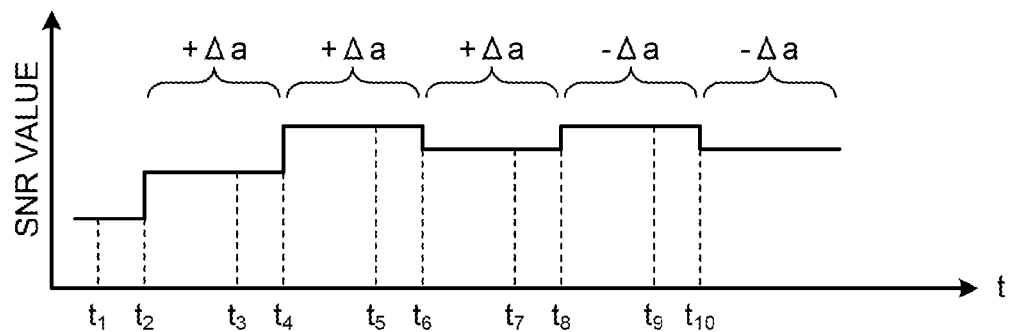
FIG. 18 is a schematic diagram illustrating an example in the course of adjusting $E_c/I_{or}$.

FIG. 18 is a schematic diagram illustrating an example in the course of adjusting $E_c/I_{or}$. For example, as illustrated in FIG. 18, the determining unit 61 refers to the SNR calculated by the SNR calculating unit 60 at a time point $t_3$. The SNR at the time point $t_3$ is greater than that at a time point $t_1$ at which SNR is referred to the last time. Furthermore, at a time point $t_2$ at which $E_c/I_{or}$ is changed the last time, $\Delta a$ is added to $E_c/I_{or}$. Accordingly, the determining unit 61 also adds $\Delta a$ to $E_c/I_{or}$ at a time point $t_4$ at which $E_c/I_{or}$ is changed this time.

Then, the determining unit 61 refers to the SNR that was calculated by the SNR calculating unit 60 at a time point $t_5$. The SNR at the time point $t_5$ is greater than that at the time point $t_3$ at which the SNR is referred to the last time. Furthermore, at the time point $t_4$ at which $E_c/I_{or}$ is changed the last time, $\Delta a$ is added to $E_c/I_{or}$. Accordingly, the determining unit 61 also adds $\Delta a$ to $E_c/I_{or}$ at a time point $t_6$ at which $E_c/I_{or}$ is changed this time.

Then, the determining unit 61 refers to the SNR that was calculated by the SNR calculating unit 60 at a time point $t_7$. The SNR at the time point $t_7$ is smaller than that at the time point $t_5$ at which the SNR is referred to the last time. Furthermore, at the time point $t_6$ at which $E_c/I_{or}$ is changed the last time, $\Delta a$ is added to $E_c/I_{or}$. Accordingly, the determining unit 61 subtracts $\Delta a$ from $E_c/I_{or}$ at a time point $t_8$ at which $E_c/I_{or}$ is changed this time.

Then, the determining unit 61 refers to the SNR calculated by the SNR calculating unit 60 at a time point $t_9$. The SNR at the time point $t_9$ is greater than that at the time point $t_7$ at which the SNR is referred to the last time. Furthermore, at the time point $t_8$ at which $E_c/I_{or}$ is changed the last time, $\Delta a$ is subtracted from $E_c/I_{or}$. Accordingly, the determining unit 61 also subtracts $\Delta a$ from $E_c/I_{or}$ at a time point $t_{10}$ at which $E_c/I_{or}$ is changed this time.

In this way, by sequentially adjusting the estimated value of $E_c/I_{or}$ such that the SNR becomes large by shifting the estimated value of $E_c/I_{or}$ at predetermined time intervals, an estimated value of $E_c/I_{or}$ can adaptively be obtained.

Furthermore, for the value of $E_c/I_{or}$ that is input to the correction matrix calculating unit 25 first time, for example, similarly to the ninth embodiment, the determining unit 61 may also use a value of $E_c/I_{or}$ estimated in accordance with the number of multi codes allocated to the receiving device 10.

Advantage of the Eleventh Embodiment

With the communication processor 20 according to the eleventh embodiment, $E_c/I_{or}$ can be estimated with a simple structure and with high accuracy.

Hardware

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

Furthermore, all or any part of the various processing functions performed by each device may also be executed by a CPU or a microcomputer, such as a micro processing unit (MPU), a micro controller unit (MCU), or the like. Furthermore, all or any part of the various processing functions may also be executed by programs analyzed and executed by the CPU or the microcomputer, such as the MPU or the MCU, or executed by hardware by wired logic.

Figure 19:
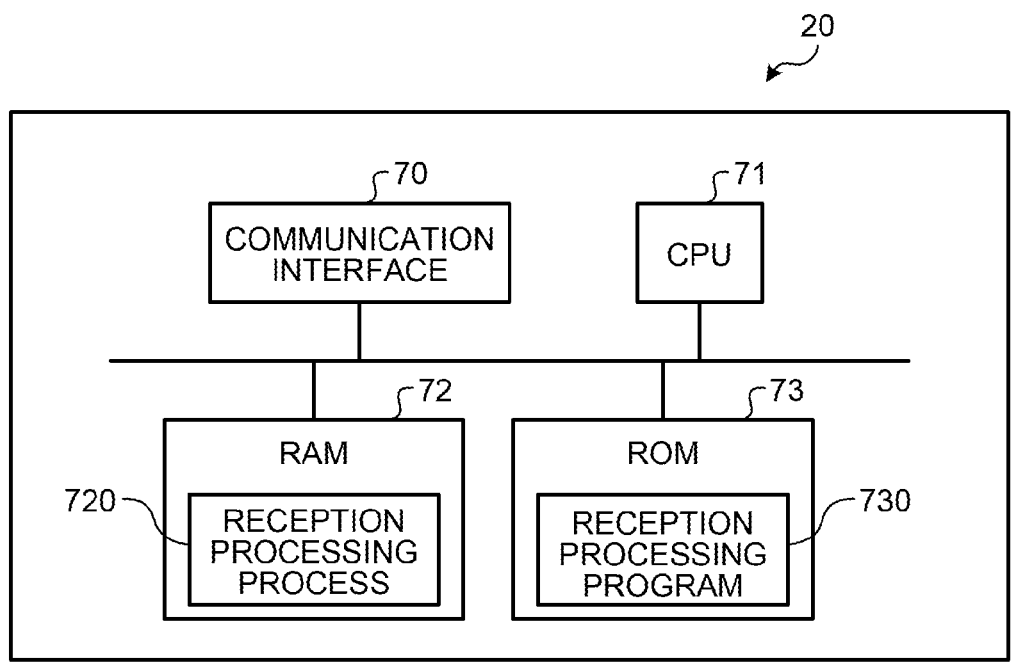
FIG. 19 is a block diagram illustrating an example of hardware of the communication processor.

Various kinds of processes described in the above embodiments can be implemented by programs prepared in advance and executed by a computer. Accordingly, in the following, a computer that executes programs having the same function as that described in the embodiment described above will be described as an example. FIG. 19 is a block diagram illustrating an example of hardware of the communication processor 20.

In FIG. 19, the communication processor 20 that executes a demodulation processing program includes a communication interface 70, a CPU 71, a RAM 72, and a ROM 73.

For example, as illustrated in FIG. 19, the ROM 73 stores therein a reception processing program 730 in advance. The CPU 71 reads the reception processing program 730 from the ROM 73 and loads the reception processing program 730 in the RAM 72. Similarly to each of the components illustrated in FIG. 2, 4, 7 to 11, 13, 14, 16, or 17, the reception processing program 730 may also be appropriately be integrated or separated. Furthermore, all the data stored in the ROM 73 does not always have to be stored in the ROM 73 and only a part of data that is used for processes may be stored in the ROM 73.

The CPU 71 allows the reception processing program 730 to function as a reception processing process 720. The reception processing process 720 arbitrarily loads various kinds of data read from the ROM 73 into corresponding areas allocated to the respective data in the RAM 72 and executes various processes on the basis of the various kinds of loaded data. In the first to the third embodiments described above, the CPU 71 executes the same functions as those performed by the channel matrix calculating unit 21, the noise power calculating unit 22, the correlation matrix calculating unit 23, the weight calculating unit 24, the correction matrix calculating unit 25, the chip equalizer 26, the correction unit 27, and the de-spreading processing unit 28.

Furthermore, in the fourth and the fifth embodiments described above, the CPU 71 executes the same functions as those performed by the DFT processing unit 30, the channel matrix calculating unit 31, the weight calculating unit 32, the chip equalizer 33, the correction unit 34, the correction matrix calculating unit 35, the IDFT processing unit 36, and the de-spreading processing unit 37.

Furthermore, in the sixth embodiment described above, the CPU 71 executes the same functions as those performed by the DFT processing unit 30, the channel matrix calculating unit 31, the weight calculating unit 32, the chip equalizer 33, the IDFT processing unit 36, the de-spreading processing unit 37, the IDFT processing unit 40, and the channel matrix calculating unit 41. Furthermore, in the sixth embodiment described above, the CPU 71 executes the same functions as those performed by the noise power calculating unit 42, the correlation matrix calculating unit 43, the weight calculating unit 44, the correction matrix calculating unit 45, and the correction unit 46.

Furthermore, in the seventh embodiment described above, the CPU 71 executes the same functions as those performed by the DFT processing unit 30, the channel matrix calculating unit 31, the weight calculating unit 32, the chip equalizer 33, the correction matrix calculating unit 35, the IDFT processing unit 36, the de-spreading processing unit 37, and the correction unit 38.

Furthermore, in the eighth embodiment described above, the CPU 71 executes the same functions as those performed by the channel matrix calculating unit 21, the noise power calculating unit 22, the correlation matrix calculating unit 23, the weight calculating unit 24, the correction matrix calculating unit 25, the chip equalizer 26, the correction unit 27, the de-spreading processing unit 28, and the S/P converting unit 29.

Furthermore, in the ninth embodiment described above, the CPU 71 executes the same functions as those performed by the channel matrix calculating unit 21, the noise power calculating unit 22, the correlation matrix calculating unit 23, the weight calculating unit 24, the correction matrix calculating unit 25, the chip equalizer 26, the correction unit 27, the de-spreading processing unit 28, and the holding unit 50.

Furthermore, in the tenth and the eleventh embodiments described above, the CPU 71 executes the same functions as those performed by the channel matrix calculating unit 21, the noise power calculating unit 22, the correlation matrix calculating unit 23, the weight calculating unit 24, the correction matrix calculating unit 25, and the chip equalizer 26. Furthermore, in the tenth and the eleventh embodiments described above, the CPU 71 executes the same functions as those performed by the correction unit 27, the de-spreading processing unit 28, the SNR calculating unit 60, and the determining unit 61.

Furthermore, the reception processing process 720 in the first embodiment described above executes the processes, such as the processes illustrated in FIG. 3, performed by the channel matrix calculating unit 21, the noise power calculating unit 22, the correlation matrix calculating unit 23, the weight calculating unit 24, the correction matrix calculating unit 25, the chip equalizer 26, the correction unit 27, and the de-spreading processing unit 28 illustrated in FIG. 2. Furthermore, all of the processing units virtually implemented by the CPU 71 do not always need to be implemented by the CPU 71, and only the processing units used for a process may be virtually implemented.

Furthermore, the reception processing process 720 described above does not need to be stored in the ROM 73 from the beginning. For example, each program is stored in a portable recording medium, such as an IC card, inserted in the receiving device 10 and the communication processor 20 acquires each program from the portable recording medium and executes the programs. Furthermore, the communication processor 20 may also acquire each program from another computer, a server device, or the like that stores therein each program via a wireless communication line, a public circuit, the Internet, a LAN, a WAN, or the like.

According to an aspect of an embodiment, an advantage is provided in that the receiving performance can be improved while suppressing an increase in cost of a receiving device.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A receiving device comprising:
  an equalizer that equalizes a plurality of reception signal sequences received via an antenna;
  a calculating unit that calculates a correction matrix by using a channel matrix, a weight of the equalizer, a power ratio $E_c/I_{or}$ of a pilot signal power $E_c$ to a reception signal power $I_{or}$, a number of multi-codes, and a spreading factor of the reception signal sequences; and
  a correction unit that corrects, by using the correction matrix, the reception signal sequences equalized by the equalizer.

2. The receiving device according to claim 1, wherein
  the calculating unit and the correction unit are provided for each spreading factor that is allocated to the receiving device, and
  each of the correction units corrects, by using the correction matrix calculated for the associated spreading factor, the reception signal sequences equalized by the equalizer.

3. The receiving device according to claim 1, further comprising a de-spreading processing unit that performs, based on the spreading factor, de-spreading on the reception signal sequences equalized by the equalizer, wherein the correction unit corrects, by using the correction matrix, the reception signal sequences that have been subjected to the de-spreading by the de-spreading processing unit.

4. The receiving device according to claim 1, further comprising a converting unit that converts the reception signal sequences to frequency components, wherein
the equalizer equalizes the reception signal sequences converted to the frequency components, and
the correction unit corrects, in a frequency domain by using the correction matrix, the reception signal sequences equalized by the equalizer.

5. The receiving device according to claim 1, further comprising:
a first converting unit that converts the reception signal sequences to frequency components;
a second converting unit that converts, to time domain signals, reception signal sequences that are equalized by the equalizer after the reception signal sequences are converted to the frequency components by the first converting unit; and
a de-spreading processing unit that performs, based on the spreading factor, de-spreading on the reception signal sequences that are converted to time domain signals by the second converting unit, wherein
the correction unit corrects, by using the correction matrix, the reception signal sequences that have been subjected to the de-spreading by the de-spreading processing unit.

6. The receiving device according to claim 5, wherein
the calculating unit calculates the correction matrix in the frequency domain by using the weight of the equalizer and the channel matrix for each frequency component converted by the first converting unit, and
the correction unit corrects, by using the correction matrix calculated in the frequency domain, the reception signal sequences that have been subjected to the de-spreading by the de-spreading processing unit.

7. The receiving device according to claim 1, wherein
the reception signal sequences are signals that are transmitted by transmission diversity using space-time block coding,
the receiving device includes a parallel converting unit that performs parallel conversion on the reception signal sequences received via the antenna to a plurality of reception signal sequences, and
the equalizer equalizes the plurality of the reception signal sequences that have been subjected to the parallel conversion by the parallel converting unit.

8. The receiving device according to claim 1, wherein the calculating unit estimates, based on the number of multi-codes allocated to the receiving device, the power ratio of the pilot signal to the reception signal and calculates the correction matrix by using the estimated power ratio.

9. The receiving device according to claim 1, wherein the calculating unit includes
a first calculating unit that calculates, at predetermined time intervals, a first correction matrix by using a first power ratio of a pilot signal to a reception signal,
a second calculating unit that calculates, at the predetermined time intervals, a second correction matrix by using a second power ratio that is greater than the first power ratio by a predetermined value, and
a third calculating unit that calculates, at the predetermined time intervals, a third correction matrix by using a third power ratio that is smaller than the first power ratio by the predetermined value, and
the correction unit includes
a first correction unit that corrects the reception signal sequences by using the first correction matrix,
a second correction unit that corrects the reception signal sequences by using the second correction matrix, and
a third correction unit that corrects the reception signal sequences by using the third correction matrix, and
the receiving device includes
a first signal-to-noise ratio calculating unit that calculates a signal-to-noise ratio of the reception signal sequences corrected by the first correction unit,
a second signal-to-noise ratio calculating unit that calculates the signal-to-noise ratio of the reception signal sequences corrected by the second correction unit,
a third signal-to-noise ratio calculating unit that calculates the signal-to-noise ratio of the reception signal sequences corrected by the third correction unit, and
an input unit that specifies, at the predetermined time intervals, a maximum signal-to-noise ratio from among signal-to-noise ratios output from the first signal-to-noise ratio calculating unit, the second signal-to-noise ratio calculating unit, and the third signal-to-noise ratio calculating unit, that specifies the calculating unit that calculates the correction matrix that is used to correct the reception signal sequences associated with the calculated and specified signal-to-noise ratio, and that inputs, to the first calculating unit as the first power ratio, the power ratio that is used by the specified calculating unit to calculate the correction matrix.

10. A receiving process method comprising:
calculating, performed by a processor, a correction matrix by using a channel matrix, a weight of an equalizer, a power ratio $E_c/I_{or}$ of a pilot signal power $E_c$ to a reception signal power $I_{or}$, a number of multi-codes, and a spreading factor of reception signal sequences;
equalizing, performed by the equalizer, a plurality of reception signal sequences received via an antenna; and
correcting, performed by the processor by using the correction matrix, the equalized reception signal sequences.

* * * * *